(12) United States Patent
Szarmes et al.

(10) Patent No.: US 7,733,492 B1
(45) Date of Patent: *Jun. 8, 2010

(54) SAGNAC FOURIER TRANSFORM SPECTROMETER HAVING IMPROVED RESOLUTION

(75) Inventors: Eric Szarmes, Honolulu, HI (US); Huan Ma, Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 336 days.

This patent is subject to a terminal disclaimer.

(21) Appl. No.: 11/431,936

(22) Filed: May 10, 2006

Related U.S. Application Data

(63) Continuation-in-part of application No. 11/145,164, filed on Jun. 3, 2005, now Pat. No. 7,433,044.

(60) Provisional application No. 60/577,512, filed on Jun. 4, 2004.

(51) Int. Cl.
*G01B 9/02* (2006.01)
*G01J 3/45* (2006.01)

(52) U.S. Cl. ..................... 356/451; 356/483

(58) Field of Classification Search ......... 356/451–456, 356/483, 521; 250/339.07–339.09; 372/32
See application file for complete search history.

(56) References Cited

U.S. PATENT DOCUMENTS

| | | | | |
|---|---|---|---|---|
| 3,765,769 | A * | 10/1973 | Treacy | 356/305 |
| 5,059,027 | A | 10/1991 | Roesler et al. | |
| 5,684,582 | A * | 11/1997 | Eastman et al. | 356/328 |
| 5,761,225 | A * | 6/1998 | Fidric et al. | 372/6 |
| 5,777,736 | A * | 7/1998 | Horton | 356/456 |
| 6,108,082 | A * | 8/2000 | Pettipiece et al. | 356/301 |
| 6,687,007 | B1 * | 2/2004 | Meigs | 356/456 |
| 7,167,249 | B1 * | 1/2007 | Otten, III | 356/456 |
| 2006/0290938 | A1 * | 12/2006 | Heintzann et al. | 356/456 |

OTHER PUBLICATIONS

Braun et al. "A high precision compact Michelson-Sagnac wavemeter" 1987 J. Phys. E: Sci. Instrum. 20 1247-1249.*

A.E. Siegman, "Lasers," University Science Books, Mill Valley, CA 1986 (ISBN 0-935702-11-5), FIG. 23.10, p. 905.

Harlander, John M. et al., "Spatial Heterodyne Spectroscopy for High Spectral Resolution Space-Based Remote Sensing," Optics and Photonics News, Jan. 2004, pp. 46-51.

Office Action (U.S. Appl. No. 11/145,164)—filed Sep. 13, 2007.

(Continued)

*Primary Examiner*—Patrick J Connolly
(74) *Attorney, Agent, or Firm*—Knobbe Martens Olson & Bear, LLP

(57) ABSTRACT

Systems and methods are disclosed for a modified Sagnac interferometer having a plurality of gratings that can be reflective or transmissive. The gratings allow measurement of wavelength spectra in counter-circulating beams of the interferometer. In one embodiment, diffraction geometries at each pair of neighboring gratings are configured so that diffractive and angular contributions reinforce each other at the second of the pair of gratings. In one embodiment, diffraction geometries at the gratings are configured so that the exiting beams of the interferometer satisfy the crossing condition wherein the exiting beams are on the opposite sides of a reference beam axis for a design wavelength input beam. Also disclosed are techniques for restoring the reinforcement and/or crossing conditions when these conditions are not otherwise met.

60 Claims, 24 Drawing Sheets

OTHER PUBLICATIONS

Office Action Response (U.S. Appl. No. 11/145,164)—filed Dec. 12, 2007.
Notice of Allowance (U.S. Appl. No. 11/145,164)—filed Apr. 9, 2008.
Request for Continued Examination (U.S. Appl. No. 11/145,164)—filed Ma 1, 2008.
Notice of Allowance (U.S. Appl. No. 11/145,164)—filed May 29, 2008.
Helg, T.L. et al., "A Novel High-resolution Interference Spectrometer," Optics and Lasers in Engineering 29 (1998), pp. 413-422.
Helg, T.L. et al., Abstract of "A high-resolution spatial heterodyning interference spectrometer," http://cat.inist.fr/?aModele=afficheN&cpsidt=1628248, accessed on Dec. 16, 2008.
Helg, T.L., Abstract of "Novel Interferometric Techniques in Profilometry and Spectrometry," http://nzresearch.org.nz/index.php/record/viewSchema/11517/3, accessed on Dec. 16, 2008.
Helg, T.L., "Novel Interferometric Techniques in Profilometry and Spectrometry," University of Auckland, Dec. 1999, Title page and notice in 2 pages, Abstract in 1 page, Acknowledgements in 1 page, Table of contents in 3 pages, pp. 1-144, Appendices in 27 pages.

\* cited by examiner

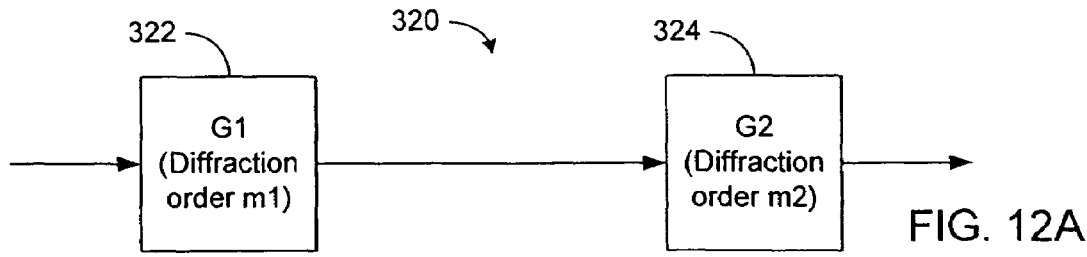
FIG. 12A
FIG. 12B
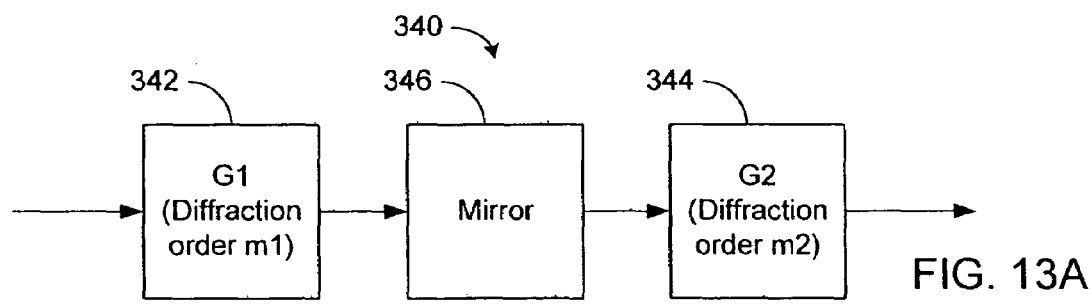
FIG. 13A
FIG. 13B

SAGNAC FOURIER TRANSFORM SPECTROMETER HAVING IMPROVED RESOLUTION

PRIORITY APPLICATIONS

This application is a continuation-in-part of, and claims priority to U.S. patent application Ser. No. 11/145,164 filed Jun. 3, 2005, now U.S. Pat. No. 7,433,044 titled "SAGNAC FOURIER TRANSFORM SPECTROMETER HAVING IMPROVED RESOLUTION", which claims priority to U.S. Provisional Patent Application No. 60/577,512 filed Jun. 4, 2004, titled "DOUBLE-GRATING SAGNAC FOURIER TRANSFORM SPECTROMETER," both of which are hereby incorporated by reference herein in their entirety.

GOVERNMENT LICENSE RIGHTS UNDER 35 U.S.C. § 202(c)(6)

The U.S. Government has a paid-up license in this invention and the right in limited circumstances to require the patent owner to license others on reasonable terms as provided for by the terms of contract No. DASG60-02-C-0048 awarded by DOD-Army SMDC.

BACKGROUND

1. Field

The present disclosure relates to the field of spectrometers, and more specifically to Sagnac interference spectrometers.

2. Description of the Related Art

In a Sagnac interferometer, an input light is split into two counter-circulating beams. The two beams, commonly called clockwise and counterclockwise beams, can have slight propagation variations due to some external influence. When the two beams combine again, such variations can be manifested in effects such as interference patterns.

Typically, splitting of the input light and combination of the two beams are achieved by a beamsplitter. The effect of the combined beams can be measured by scanning across the output, e.g., interference pattern, of the combined beams.

In a Sagnac interference spectrometer, a diffraction grating is included in the optical path of the counter-propagating beams. Dispersion in the grating alters the propagation direction of the two beams, shifting one with respect to the other. The shift in the beams is manifested by a variation in the resultant interference patterns. This interference pattern can be processed to determine the spectral characteristics of the counter-propagating beams. In particular, a Fourier transform of the interference pattern yields the wavelength spectra of the beams.

SUMMARY

One embodiment of the present disclosure relates to a Sagnac interferometer that includes a beamsplitter arranged to receive an input beam of light having a distribution of wavelengths, and split the input beam into first and second beams that travel along first and second paths, respectively. The first and second beams recombine along an output beam path. The Sagnac interferometer further includes a first grating arranged so as to diffract the first beam. The first grating is oriented to provide a first incident angle and a first diffraction angle for a particular wavelength, $\lambda_1$, in the first beam. The first diffraction angle depends on the first incident angle and the wavelength, $\lambda_1$. The Sagnac interferometer further includes a second grating arranged so as to diffract the first beam after being diffracted by the first grating. The second diffraction grating is oriented to provide a second incident angle and a second diffraction angle for the wavelength, $\lambda_1$, such that the second incident angle depends on the first diffraction angle. The second diffraction angle depends on the second incident angle and the wavelength, $\lambda_1$. The first and second gratings are oriented so that another wavelength, $\lambda_2$, in the distribution yields a second diffraction angle which is different from the second diffraction angle for the first wavelength, $\lambda_1$. The difference between the second diffraction angles for wavelengths $\lambda_2$ and $\lambda_1$ includes (i) a first contribution caused the difference in the wavelengths on the diffraction of the first beam by the second grating and (ii) a second contribution caused by a difference in the second incident angle resulting from the difference in the first diffraction angle, with the first contribution reinforcing the second contribution.

Another embodiment of the present disclosure relates to a Sagnac interferometer that includes a beamsplitter arranged to receive an input beam of light having a distribution of wavelengths and splits the input beam into first and second beams that travel along first and second paths, respectively. The first and second beams recombine along an output beam path. The Sagnac interferometer further includes a first grating disposed in the first optical path to diffract the first beam by a first angle. The Sagnac interferometer further includes a second grating disposed in the first optical path to diffract the first beam by a second angle after being diffracted by the first grating. The first and second gratings are configured such that first and second optical beams in the output beam path have an angular separation that is larger than either the first angle or the second angle.

Yet another embodiment of the present disclosure relates to a Sagnac interferometer that includes a beamsplitter arranged to receive an input beam of light having a distribution of wavelengths and splits the input beam into first and second beams that travel along first and second paths, respectively. The first and second beams recombine along an output beam path. The Sagnac interferometer further includes a first grating disposed in the first optical path so as to diffract the first beam. The Sagnac interferometer further includes a second grating disposed in the first optical path to diffract the first beam after being diffracted by the first grating. The first and second gratings are further disposed in the second optical path to diffract the second optical beam. The first and second gratings are oriented so as to satisfy a principle of reinforcement.

Yet another embodiment of the present disclosure relates to a Sagnac interferometer that includes means for splitting an input beam of light having a distribution of wavelengths into first and second beams that travel along first and second paths, respectively. The first and second beams recombine along an output beam path. The Sagnac interferometer further includes first means for diffracting the first beam. The Sagnac interferometer further includes second means for diffracting the first beam after being diffracted by the first diffracting means. The first and second diffracting means satisfy a principle of reinforcement.

Yet another embodiment of the present disclosure relates to a Sagnac interferometer that includes a beamsplitter arranged to receive an input beam of light having a distribution of wavelengths and splits the input beam into first and second beams that travel along first and second paths, respectively. The first and second beams recombine along an output beam path. The Sagnac interferometer further includes a plurality of gratings disposed in the first path so as to diffract the first optical beam by a first angle. The plurality of gratings are further disposed in the second optical path so as to diffract the second optical beam a second angle. The plurality of gratings are arranged such that when the first and second optical beams are combined along the output beam path, the angular separation between the first and second optical beams is larger than the absolute value of the first angle and larger than the absolute value of the second angle.

Yet another embodiment of the present disclosure relates to a Sagnac interferometer that includes a beamsplitter arranged to receive an input beam of light having a distribution of wavelengths and splits the input beam into first and second beams that travel along first and second paths, respectively. The first and second beams recombine along an output beam path. The Sagnac interferometer further includes a plurality of gratings disposed in the first path so as to diffract the first optical beam a first angle. The plurality of gratings are further disposed in the second optical path so as to diffract the second optical beam at a second angle. The plurality of gratings satisfy a principle of crossing.

Yet another embodiment of the present disclosure relates to a Sagnac interferometer that includes means for splitting input beam of light having a distribution of wavelengths into first and second beams that travel along first and second paths, respectively. The first and second beams recombine along an output beam path. The Sagnac interferometer further includes means for diffracting the first optical beam at a first angle and the second optical beam at a second angle. The diffracting means are arranged such that when the first and second optical beams are combined along the output beam path, the angular separation between the first and second optical beams is larger than the absolute value of the first angle and larger than the absolute value of the second angle.

Yet another embodiment of the present disclosure relates to a laser system that includes a laser outputting a laser beam having a distribution of wavelengths. The laser system further includes a beamsplitter disposed to receive the laser beam and divert a portion of the laser beam. The system further includes a Sagnac interferometer having a plurality of diffraction gratings disposed with respect to the beamsplitter to receive the diverted portion of the laser beam to measure the distribution of wavelengths thereof.

Yet another embodiment of the present disclosure relates to a Sagnac interferometer that includes a beamsplitter arranged to receive an input beam of light having a distribution of wavelengths and splits the input beam into first and second beams that travel along first and second paths, respectively. The first and second beams recombine along an output beam path. The Sagnac interferometer further includes a first grating arranged so as to diffract the first beam. The first grating is oriented to provide a first incident angle and a first diffraction angle, with the first diffraction angle depending on the first incident angle and the wavelength. The Sagnac interferometer further includes a second grating arranged so as to diffract the first beam after being diffracted by the first grating. The second diffraction grating is oriented to provide a second incident angle and a second diffraction angle such that the second incident angle depends on the first diffraction angle, with the second diffraction angle depending on the second incident angle and the wavelength. The first and second gratings are oriented so that a change in wavelength in the first optical beam changes the second diffraction angle. The change in the second diffraction angle includes (i) a first contribution caused the change in wavelength on the diffraction of the first beam by the second grating and (ii) a second contribution caused by a change in the second incident angle resulting from the change in the first diffraction angle, with the first contribution reinforcing the second contribution.

Yet another embodiment of the present disclosure relates to a Sagnac interferometer that includes a beamsplitter arranged to receive an input beam of light having a distribution of wavelengths and splits the input beam into first and second beams that travel along first and second paths, respectively. The first and second beams recombine along an output beam path. The Sagnac interferometer further includes a first grating arranged so as to diffract the first beam. The first grating is oriented to provide a first incident angle and a first diffraction angle for each wavelength in the distribution. The first diffraction angles depend on the first incident angle and the distribution of wavelengths. The Sagnac interferometer further includes a second grating arranged so as to diffract the first beam after being diffracted by the first grating. The second diffraction grating is oriented to provide a second incident angle and a second diffraction angle for each wavelength in the distribution such that the second incident angles depend on the first diffraction angles. The second diffraction angles depend on the second incident angles and the distribution of wavelengths. The first and second gratings are oriented so that a change in the distribution of wavelength in the first optical beam changes the second diffraction angles. The change in the second diffraction angles includes (i) a first contribution caused the change in the distribution of wavelengths on the diffraction of the first beam by the second grating and (ii) a second contribution caused by a change in the second incident angles resulting from the changes in the first diffraction angles. The first contribution reinforces the second contribution.

Yet another embodiment of the present disclosure relates to a Sagnac interferometer that includes a beamsplitter arranged to receive an input beam of light having different wavelengths $\lambda_1$ and $\lambda_2$, and split the input beam into first and second beams that travel along first and second paths, respectively. The first and second beams recombine along an output beam path. The Sagnac interferometer further includes a first grating arranged so as to diffract the first beam. The first grating is oriented to provide a first incident angle and a first diffraction angle for the wavelength, $\lambda_1$, in the first beam. The first diffraction angle depends on the first incident angle and the wavelength, $\lambda_1$. The Sagnac interferometer further includes a second grating arranged so as to diffract the first beam after being diffracted by the first grating. The second diffraction grating is oriented to provide a second incident angle and a second diffraction angle for the wavelength, $\lambda_1$, such that the second incident angle depends on the first diffraction angle. The second diffraction angle depends on the second incident angle and the wavelength, $\lambda_1$. The first and second gratings are oriented so that the wavelength, $\lambda_2$, causes the second diffraction angle to be different. The difference in the second diffraction angle is produced by the different wavelength, $\lambda_2$, including (i) a first contribution caused the difference in the wavelengths on the diffraction of the first beam by the second grating and (ii) a second contribution caused by a difference in the second incident angle resulting from the difference in the first diffraction angle, with the first contribution reinforcing the second contribution.

Yet another embodiment of the present disclosure relates to a Sagnac interferometer that includes a beamsplitter arranged to receive an input beam of light having a wavelength and split the input beam into first and second beams that travel along first and second paths, respectively. The first and second beams recombine along an output beam path. The Sagnac interferometer further includes a first grating disposed in the first optical path to diffract the first beam by a first angle. The Sagnac interferometer further includes a second grating disposed in the first optical path to diffract the first beam by a second angle after being diffracted by the first grating. The first and second gratings are configured such that first and second optical beams in the output beam path have an angular separation that is larger than either the first angle or the second angle.

Yet another embodiment of the present disclosure relates to a Sagnac interferometer that includes a beamsplitter arranged to receive an input beam of light having a wavelength and split the input beam into first and second beams that travel along first and second paths, respectively. The first and second beams recombine along an output beam path. The Sagnac interferometer further includes a first grating disposed in the first optical path so as to diffract the first beam. The Sagnac interferometer further includes a second grating disposed in the first optical path to diffract the first beam after being diffracted by the first grating. The first and second gratings are further disposed in the second optical path to diffract the second optical beam. The first and second gratings are oriented so as to satisfy the principle of reinforcement.

Yet another embodiment of the present disclosure relates to a Sagnac interferometer that includes means for splitting an input beam of light having a wavelength into first and second beams that travel along first and second paths, respectively. The first and second beams recombine along an output beam path. The Sagnac interferometer further includes first means for diffracting the first beam. The Sagnac interferometer further includes second means for diffracting the first beam after being diffracted by the first diffracting means. The first and second diffracting means satisfy the principle of reinforcement.

Yet another embodiment of the present disclosure relates to a Sagnac interferometer that includes a beamsplitter arranged to receive an input beam of light having a wavelength and split the input beam into first and second beams that travel along first and second paths, respectively. The first and second beams recombine along an output beam path. The Sagnac interferometer further includes a plurality of gratings disposed in the first path so as to diffract the first optical beam by a first angle. The plurality of gratings are further disposed in the second optical path so as to diffract the second optical beam a second angle. The plurality of gratings are arranged such that when the first and second optical beams are combined. The angular separation between the first and second optical beams is larger than the absolute value of the first angle and larger than the absolute value of the second angle.

Yet another embodiment of the present disclosure relates to a Sagnac interferometer that includes a beamsplitter arranged to receive an input beam of light having a wavelength and split the input beam into first and second beams that travel along first and second paths, respectively. The first and second beams recombine along an output beam path. The Sagnac interferometer further includes a plurality of gratings disposed in the first path so as to diffract the first optical beam a first angle. The plurality of gratings are further disposed in the second optical path so as to diffract the second optical beam at a second angle. The plurality of gratings satisfy the principle of crossing.

Yet another embodiment of the present disclosure relates to a Sagnac interferometer that includes means for splitting input beam of light having a wavelength into first and second beams that travel along first and second paths, respectively. The first and second beams recombine along an output beam path. The Sagnac interferometer further includes means for diffracting the first optical beam at a first angle and the second optical beam at a second angle. The diffracting means are arranged such that when the first and second optical beams are combined. The angular separation between the first and second optical beams is larger than the absolute value of the first angle and larger than the absolute value of the second angle.

Yet another embodiment of the present disclosure relates to a laser system that includes a laser outputting a laser beam having a wavelength. The laser system further includes a beamsplitter disposed to receive the laser beam and divert a portion of the laser beam. The system further includes a Sagnac interferometer disposed with respect to the beamsplitter to received the diverted portion of the laser beam to measure the wavelength thereof.

Yet another embodiment of the present disclosure relates to a Sagnac interferometer that includes a beamsplitter arranged to receive an input beam of light having a wavelength and split the input beam into first and second beams that travel along first and second paths, respectively. The first and second beams recombine along an output beam path. The Sagnac interferometer further includes a first grating arranged so as to diffract the first beam. The first grating is oriented to provide a first incident angle and a first diffraction angle, with the first diffraction angle depending on the first incident angle and the wavelength. The Sagnac interferometer further includes a second grating arranged so as to diffract the first beam after being diffracted by the first grating. The second diffraction grating is oriented to provide a second incident angle and a second diffraction angle such that the second incident angle depends on the first diffraction angle, with the second diffraction angle depending on the second incident angle and the wavelength. The first and second gratings are oriented so that a change in wavelength in the first optical beam changes the second diffraction angle. The change in the second diffraction angle includes (i) a first contribution caused the change in wavelength on the diffraction of the first beam by the second grating and (ii) a second contribution caused by a change in the second incident angle resulting from the change in the first diffraction angle, with the first contribution reinforcing the second contribution.

Yet another embodiment of the present disclosure relates to a Sagnac interferometer that includes a beamsplitter arranged to receive an input beam of light having a distribution of wavelength and split the input beam into first and second beams that travel along first and second paths, respectively. The first and second beams recombine along an output beam path. The Sagnac interferometer further includes a first grating arranged so as to diffract the first beam. The first grating is oriented to provide a first incident angle and a first diffraction angle. The first diffraction angle depends on the first incident angle and the distribution of wavelength. The Sagnac interferometer further includes a second grating arranged so as to diffract the first beam after being diffracted by the first grating. The second diffraction grating is oriented to provide a second incident angle and a second diffraction angle such that the second incident angle depends on the first diffraction angle. The second diffraction angle depends on the second incident angle and the distribution of wavelength. The first and second gratings are oriented so that a change in the distribution of wavelength in the first optical beam changes the second diffraction angle. The change in the second diffraction angle includes (i) a first contribution caused the change in the distribution of wavelength on the diffraction of the first beam by the second grating and (ii) a second contribution caused by a change in the second incident angle resulting from the change in the first diffraction angle. The first contribution reinforces the second contribution.

BRIEF DESCRIPTION OF THE DRAWINGS

FIG. 12A is a block diagram depiction of a pair of neighboring reflective gratings;

FIG. 12B is a table of various diffraction configurations for the grating pair of FIG. 12A, where some of the configurations result in reinforcement;

FIG. 13A is a block diagram depiction of a pair of neighboring transmissive gratings;

FIG. 13B is a table of various diffraction configurations for the grating pair of FIG. 13A, where some of the configurations result in reinforcement;

These and other aspects, advantages, and novel features of the present teachings will become apparent upon reading the following detailed description and upon reference to the accompanying drawings. In the drawings, similar elements may have similar reference numerals.

DETAILED DESCRIPTION OF SOME EMBODIMENTS

Various embodiments described herein generally relate to systems and methods for measuring wavelength spectra and more particularly to Sagnac Fourier transform spectrometers. Such spectrometers comprise Sagnac interferometers that include dispersive elements such as diffraction gratings which diffract light having different wavelength by different amounts.

Figure 1:
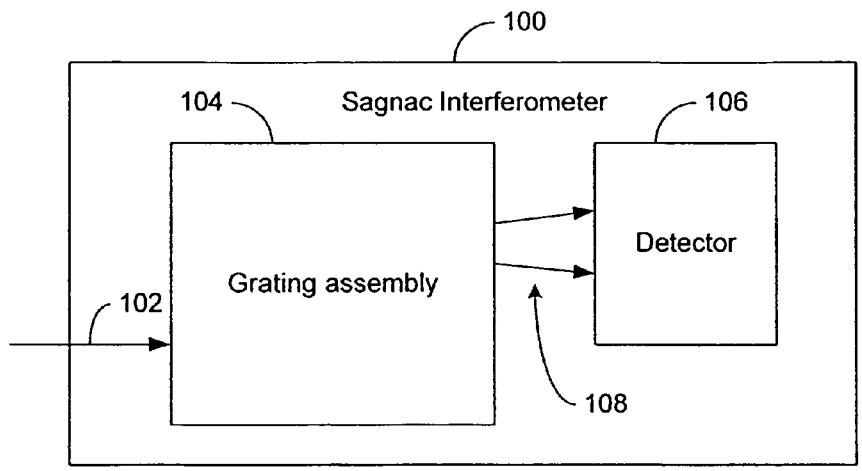
FIG. 1 is a block diagram schematically illustrating one embodiment of a Sagnac interferometer having a grating assembly that separates counter-propagating beams in the Sagnac interferometers so as to be detectable by a detector.

FIG. 1 shows one embodiment of a Sagnac interferometer 100 that includes a grating assembly 104 that can be configured to receive an input beam 102 and generate diffracted outputs 108 that can be detected by a detector 106. The diffracted outputs 108 result from light from the input beam 102 being diffracted from a plurality of diffraction gratings (not shown). One of the outputs 108 can result from a portion of the input beam 102 traveling through the grating assembly 104 along a first path, and the other output can result from a portion of the input beam 102 traveling through the grating assembly 104 along a second path. The input beam 102 may be split into the first and second paths by a beamsplitter (not shown). The light may propagate clockwise and counter-clockwise along the first and second paths respectively. These counter-propagating beams may be re-combined by the beamsplitter and interfered producing an interference pattern. This intereference pattern is affected by the dispersion of the gratings assembly and thus include spectral information which can be extracted therefrom. In certain embodiments, the interference pattern received by the detector 106 is processed to determine the wavelength spectra of the input beam 102. As described above, for example, the Fourier transform of the intereference pattern yields the wavelength spectra of diffracted outputs 108. A processor (not shown) may be included to process the interference pattern and obtain the spectral information therefrom.

Various components of the grating assembly 104 can be configured to enhance the effect of diffraction on each of the outputs 108. In some embodiments, such enhanced diffraction produces a greater divergence and separation of the outputs 108. Increased divergence and separation means that separate wavelength components are separated more and are thus more resolvable.

Accordingly, the present disclosure includes various techniques for achieving enhanced separation and/or divergence of beams traveling through the first and second paths of the grating assembly to improve the spectral sensitivity of the interferometer. As described herein, the grating assembly 104 can include a plurality of diffraction gratings. The diffraction gratings can be a reflective type, a transmissive type, or some combination thereof. Some embodiments of the grating assembly 104 can also include one or more mirrors. Some embodiments of the grating assembly 104 can also include a beamsplitter. As shown in FIG. 1, the interferometer 100 can receive the input beam 102 from a remote location, or from a different component that is part of the same system.

Figure 2:
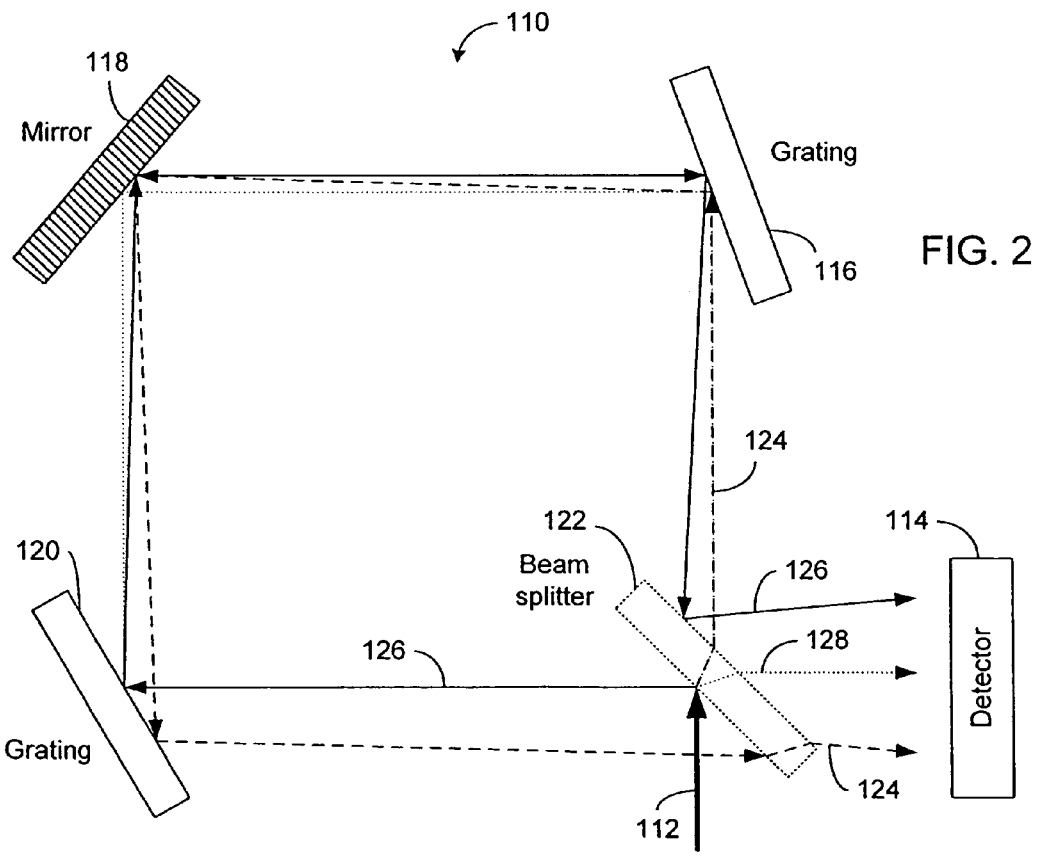
FIG. 2 schematically illustrates one embodiment of the Sagnac interferometer with two gratings.

FIG. 2 shows an example embodiment of a grating assembly 110 having two example gratings 116 and 120. The grating assembly 110 is designed for a wavelength $\lambda_o$ such that an optical beam having a wavelength corresponding to the design wavelength $\lambda_o$ propagates along a design path or axis 128. An input beam 112 having a wavelength $\lambda$ that is offset from the design wavelength by an amount, $\Delta\lambda$, (i.e., $\lambda=\lambda_o+\Delta\lambda$) is shown to impinge on a beamsplitter 122. A portion of the input beam 112 is transmitted and travels through the grating assembly 110 along a first path (depicted as a dashed line 124). A portion of the input beam 112 is shown to be reflected at the beamsplitter 122 and travel through the grating assembly 110 along a second path (depicted as a solid line 126). The transmitted path 124 and the reflected path 126 are depicted as deviating from the design path (depicted as the dotted line 128), which, as described above, corresponds to an input beam's design wavelength $\lambda_o$. For an optical beam having the design wavelength $\lambda_o$, generally no deviation is present and the reflected and transmitted beam overlap and propagate along the design path or axis. For the purpose of description, the transmitted, reflected, and design paths may be referred to as transmitted, reflected, and design beams, respectively.

As shown in the example configuration of FIG. 2, the transmitted beam 124 is shown to impinge on the grating 116. A portion of the diffraction of the incident beam 124 is shown to travel to the mirror 118, and then to the grating 120. A portion of the diffraction of the incident beam is shown to travel through the beamsplitter 122, reflect therefrom, and then propagate towards a detector 114 as the transmitted beam 124 on a first side of the design beam 128. Similarly, the reflected beam 126 is shown to impinge on the grating 120. A portion of the diffraction of the incident beam 126 is shown to travel to the mirror 118, and then to the grating 116. A portion of the diffraction of the incident beam is shown to travel to the beamsplitter 122, and then towards the detector 114 as the reflected beam 126 on the second side of the design beam 128.

In some embodiments, the gratings and possibly one or more mirrors or specularly reflective optical elements can be arranged so that the transmitted beam and the reflected beam can have increased separation, and/or be positioned on the opposite sides of the design beam path or axis 128. As used herein, the term mirror is defined to include specularly reflective optical elements. Such mirrors may be substantially flat or curved, may or may not have optical power, may be totally or partially reflecting, and may include other features. For example, the mirrors may comprise a curved optical element or a diffractive or holographic optical element with power that shapes the beam. The mirrors may comprise a reflective film such as a metal film deposited on a substrate or may comprise a component prism reflector. The mirror may have other configurations as well.

As described herein, the increased separation of the two beams can be achieved by using the principle of reinforcement described in the present disclosure. The positioning of the two beams on the opposite sides of the design beam path or axis can be achieved by using the principle of crossing also discussed in the present disclosure.

Figure 3:
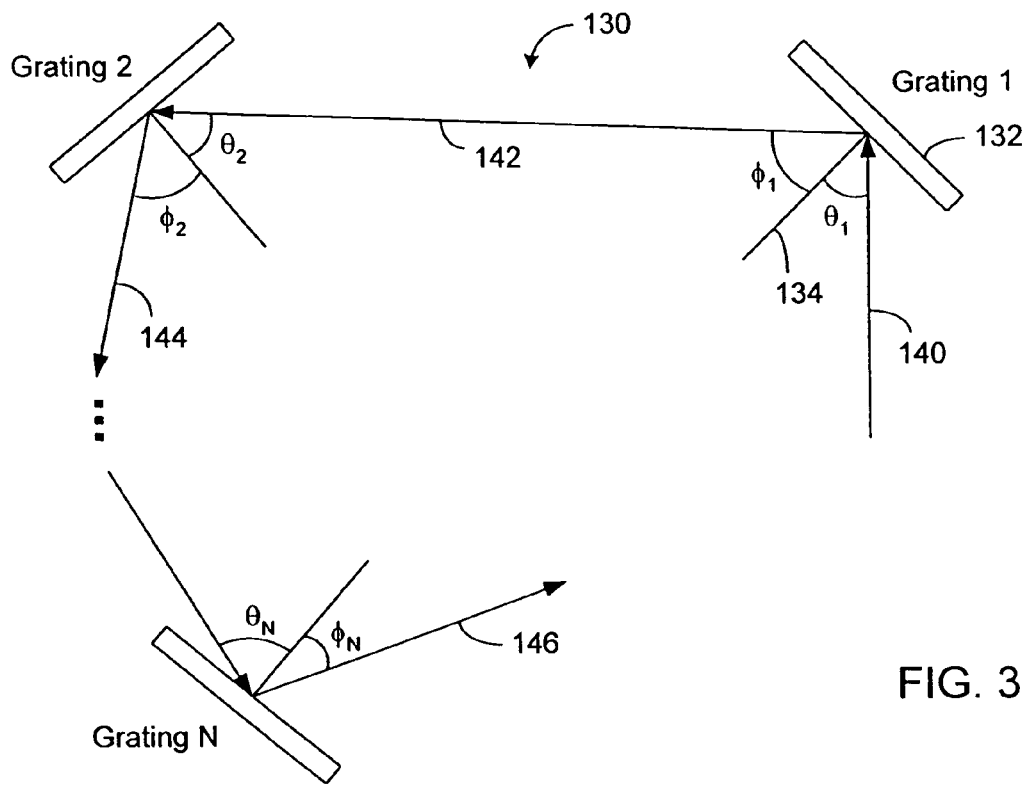
FIG. 3 schematically illustrates one embodiment of a grating assembly having N gratings.

For the purpose of describing the various reinforcement and crossing principles and associated techniques, FIGS. 3 to 4 show a convention that can be used to characterize the diffraction of a beam. FIG. 3 shows that for a grating assembly 130 having N gratings (N>1), incident and diffraction angles can be measured relative to the respective normal lines. For example, a grating 132 is shown to have a normal line 134. An incident beam 140 is shown to form an incident angle $\theta_1$ with respect to the normal 134, and a diffracted beam 142 is shown to form a diffraction angle $\phi_1$ with respect to the normal 134.

The diffracted beam 142 is shown to be an incident beam for the second grating with incident angle $\theta_2$ to yield a diffracted beam 144 at angle $\phi_2$, and so on, until the N-th grating yields a diffracted beam 146. It will be understood that the example diffraction pattern shown in FIG. 3 represents one of the two paths (transmitted and reflected); thus, the other path can follow a generally similar path in reverse. The two opposing paths, however, can be different depending on, for example, the wavelength of the input beam. In some embodiments, the gratings can be configured so that such differences in the transmitted and reflected paths satisfy the reinforcement and/or crossing principles.

Figure 4A:
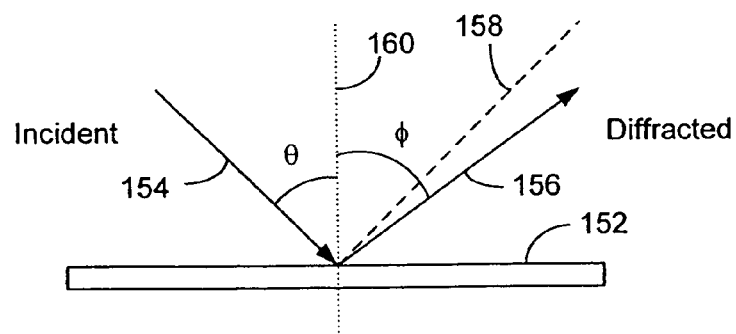
FIGS. 4A and 4B schematically illustrate example diffraction geometry conventions for reflective and transmissive gratings.

FIG. 4A shows that for a given reflective grating 152, an incident beam 154 at an angle of $\theta$ is shown to yield a diffracted beam 156 at an angle of $\phi$, with both angles relative to a normal 160. A dashed line 158 indicates the specular reflection geometry ($\phi=\theta$). The diffraction angle $\phi$ changes with incident angle $\theta$ and wavelength $\lambda$ depending on the orientation of the diffraction grating 152, which can be characterized by the relationship of incident and diffracted angles, ($\phi=\theta$ (e.g., whether $\theta>\phi$ or $\theta<\phi$). Table 1 lists the change diffraction angle $\phi$ with incident angle $\theta$ and wavelength $\lambda$ for different orientations of the reflective grating 152:

TABLE 1

| Relative values of $\theta$ and $\phi$ | Change | Effect on $\phi$ |
| --- | --- | --- |
| $\theta > \phi$ | Increase $\theta$ | Increase $\phi$ |
| $\theta > \phi$ | Decrease $\theta$ | Decrease $\phi$ |
| $\theta < \phi$ | Increase $\theta$ | Increase $\phi$ |
| $\theta < \phi$ | Decrease $\theta$ | Decrease $\phi$ |
| $\theta > \phi$ | Increase $\lambda$ | Decrease $\phi$ |
| $\theta > \phi$ | Decrease $\lambda$ | Increase $\phi$ |
| $\theta < \phi$ | Increase $\lambda$ | Increase $\phi$ |
| $\theta < \phi$ | Decrease $\lambda$ | Decrease $\phi$ |

Figure 4B:
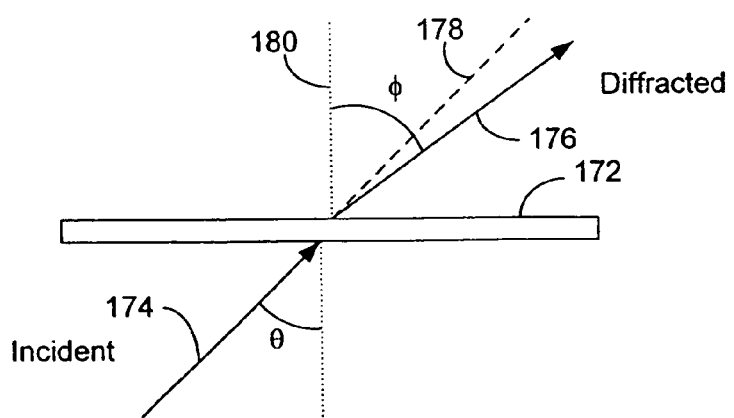

FIG. 4B shows that for a given transmissive grating 172, an incident beam 174 at an angle of $\theta$ is shown to yield a diffracted beam 176 at an angle of $\phi$, with both angles relative to corresponding normals 180. A dashed line 178 indicates the transmission geometry when no diffraction occurs ($\phi=\theta$). The diffraction characteristics for the transmissive grating 172 are similar to that of the reflective grating as listed in Table 1.

As is generally known, the foregoing reflective and transmissive diffraction of FIGS. 4A and 4B can be described by one form of diffraction equation $$\sin(\phi)-\sin(\theta)=m\lambda/g, \quad (1)$$

where g is the grating period, and m is the diffraction order that can be a negative, zero, or positive integer. In one example convention, the diffraction order is negative when $\theta>\phi$, zero when $\theta=\phi$, and positive when $\theta<\phi$. Differentiation of Equation 1 to first order in $d\phi$, $d\lambda$, and $d\theta$ yields $$\cos(\phi)d\phi=(m/g)d\lambda+\cos(\theta)d\theta. \quad (2)$$

As seen in Equation 2, the amount of deviation of the diffracted beam ($d\phi$) can depend on two contributions: a diffractive contribution due to a variation $d\lambda$ in the wavelength $\lambda$, and an angular contribution due to a variation $d\theta$ in the incidence angle $\theta$.

In some embodiments of the present disclosure, the grating assembly can be configured so that for the second grating of a given pair of gratings, the two contributions to the variation in the diffracted beam ($d\phi$) reinforce each other, instead of partially or wholly canceling each other. This effect is referred herein as the principle of reinforcement. Another way of stating the principle of reinforcement is that the diffractive contribution ($d\lambda$ term) at the second grating have the same sign as the angular contribution ($d\theta$ term) at the second grating. Examples of the principle of reinforcement are described below in greater detail.

Figure 5A:
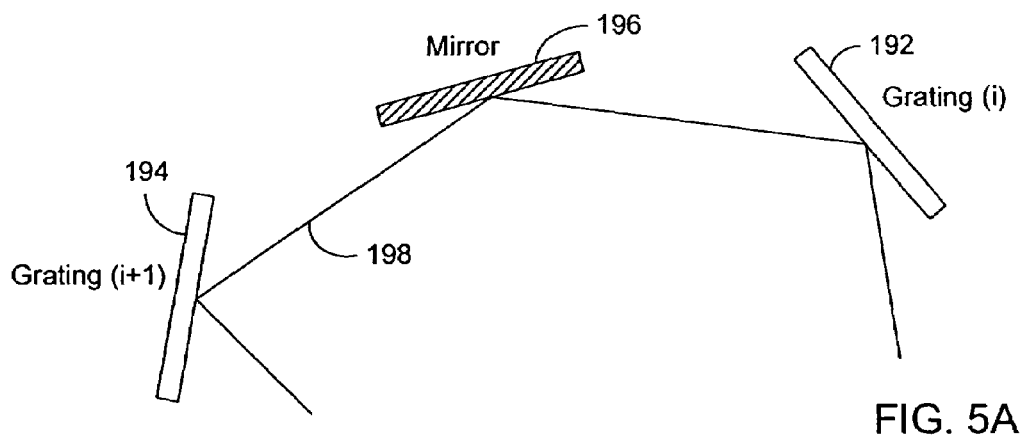
FIG. 5A schematically illustrates that in one embodiment, a mirror can be positioned between a pair of neighboring gratings to alter the diffraction geometry of at least one grating.
Figure 5B:
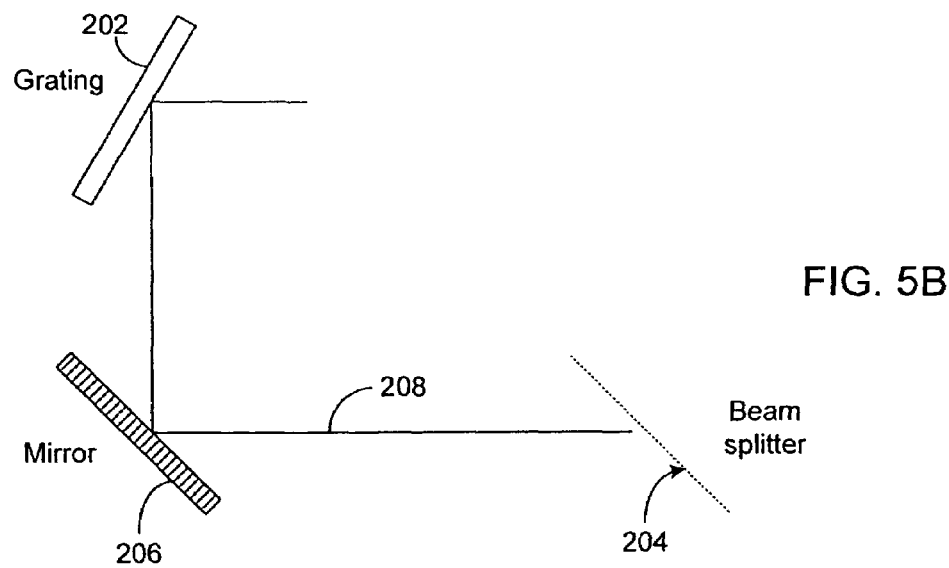
FIG. 5B schematically illustrates that in one embodiment, a mirror can be positioned between a beamsplitter and a grating to alter the manner in which a beam impinges on the beamsplitter.
Figure 6:
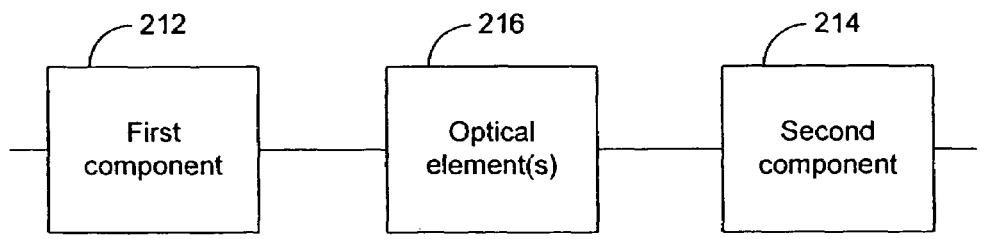
FIG. 6 is a block diagram schematically illustrating that, in general, an optical element can be positioned between two neighboring components of the Sagnac interferometer.

In addition to the diffraction properties described above in reference to FIGS. 3 and 4, various optical elements can be used in conjunction with the various gratings to achieve certain desired results. FIG. 5A shows that in one embodiment, a mirror 196 can be inserted between two neighboring gratings 192 and 194 so as to alter the beam path configuration 198 between the two gratings. FIG. 5B shows that in one embodiment, a mirror 206 can be inserted between a grating 202 and a beamsplitter 204 so as to alter the beam path configuration 208 between the grating 202 and the beamsplitter 204. In general, as shown in FIG. 6, an optical element 216 can be inserted between a first component 212 and a second component 214 so as to alter the beam configuration and or the beam path configuration in some desired manner. The first and second components 212 and 214 can include a pair of gratings, or a grating and a beamsplitter. The optical element 216 can include a mirror, as shown by example in FIGS. 5A and 5B, or optics that shapes the beams between the two components 212 and 214. Some examples of the beam-shaping optics are described below in greater detail.

In one embodiment, an odd number of mirrors can be added between two gratings (that do not provide reinforcement without the mirror(s)) or between a grating and a beamsplitter (that do not provide crossing without the mirror(s)) to provide reinforcement and/or crossing. In one embodiment, one mirror can provide such functionality.

In one embodiment, an even number of mirrors can be added between two gratings, or between a grating and a beamsplitter, not to provide reinforcement and/or crossing, but for other purpose. For example, it may be desirable to condition or route the beams between two elements (two gratings or grating/beamsplitter) by use of mirrors. To achieve such a purpose, an even number of mirrors can be added between the two elements that already satisfy reinforcement and/or crossing.

Figure 7:
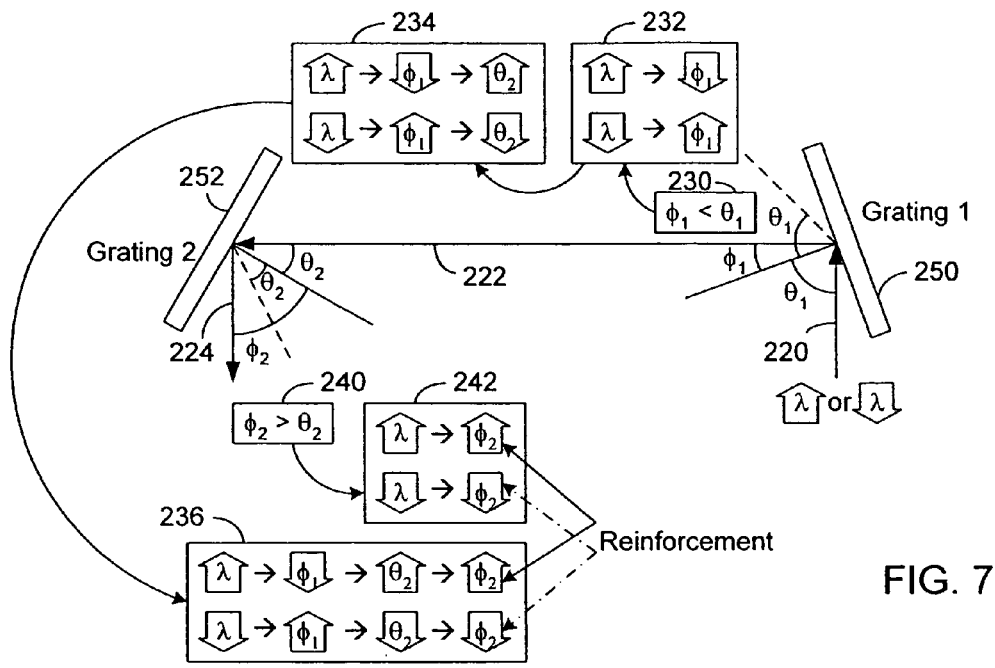
FIG. 7 schematically illustrates an example of a reinforcement of diffractive and angular contributions among a pair of neighboring gratings, due to a change in the beam's wavelength.

Based on the foregoing, FIG. 7 shows an example of diffraction caused by a pair of gratings that result in reinforcement of the diffraction and angular contributions at the second grating. An incident beam 220 is shown to impinge on a first grating 250 at an angle $\theta_1$. A diffracted beam 220 is shown to be at an angle $\phi_1$ that is less than $\theta_1$ (indicated in a legend box 230). Thus, as indicated by a legend box 232, and according to Table 1, an increase in the wavelength $\lambda$ of the beam 220 results in a decrease in the diffraction angle $\phi_1$. Conversely, a decrease in the wavelength $\lambda$ of the beam 220 results in an increase in the diffraction angle $\phi_1$.

As further shown in FIG. 7, a decrease in the diffraction angle $\phi_1$ results in an increase in the incident angle $\theta_2$ at the second grating 252 (due to geometry, as indicated in a legend box 234). Conversely, an increase in the diffraction angle $\phi_1$ results in a decrease in the incident angle $\theta_2$ at the second grating 252. Such an/a increase/decrease in the incident angle $\theta_2$ at the second grating 252 results in an/a increase/decrease in the diffraction angle $\phi_2$ (as indicated in a legend box 236).

As further shown in FIG. 7, the diffraction at the second grating 224 is oriented such that $\phi_2$ is greater than $\theta_2$ (as indicated in a legend box 240). Thus, an/a increase/decrease in the wavelength $\lambda$ results in an/a increase/decrease in the diffraction angle $\phi_2$ (as indicated in a legend box 242, and according to Table 1). The change (increase or decrease) in the diffraction angle $\phi_2$ with increase or decrease in wavelength $\lambda$ at the second grating 252 includes both the diffractive contribution of the second grating 252 (see legends 240 and 242) and the angular contribution (see legends 234 and 236) introduced by the first grating. The two contributions reinforce each other yielding a larger aggregate diffraction angle $\phi_2$.

Figure 8:
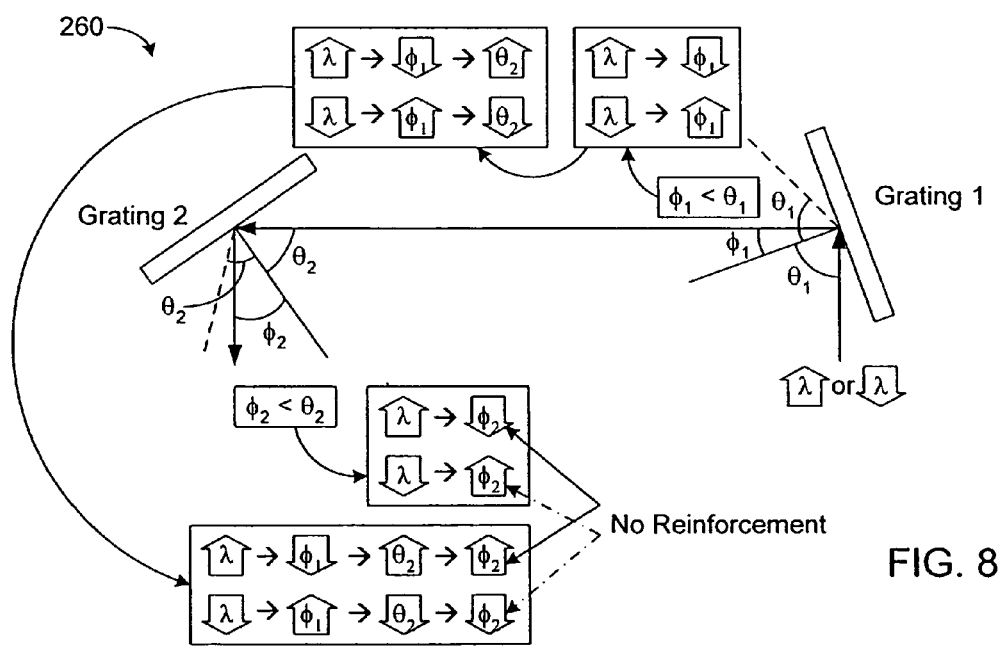
FIG. 8 schematically illustrates an example diffraction configuration where the diffractive contribution counters the angular contribution, such that reinforcement does not occur.

FIG. 8 shows a configuration where such reinforcement is not achieved. The example diffraction at the first grating is shown oriented similar to that of FIG. 7. Unlike the configuration of FIG. 7 (where $\phi_2>\theta_2$), however, diffraction at the second grating is such that $\phi_2<\theta_2$ based on the orientation of the second grating. Thus, an/a increase/decrease in the wavelength results in a/an decrease/increase in the diffraction angle $\phi_2$ at the second grating. Consequently, an/a increase/decrease in the diffractive contribution for the second grating is accompanied by a/an decrease/increase in the angular contribution at the second grating, such that the two contributions are competing against each other.

Figure 9:
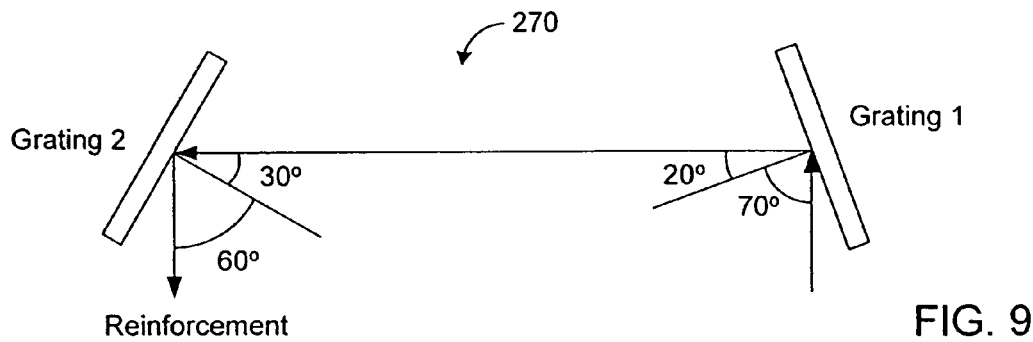
FIG. 9 schematically illustrates a specific example of the configuration of FIG. 7.

FIG. 9 shows a specific example 270 of the grating pair of FIG. 7, where reinforcement is satisfied. As shown, an incident angle of approximately 70 degrees and a diffraction angle of approximately 20 degrees at the first grating, in conjunction with incident and diffraction angles of approximately 30 and 60 degrees at the second grating, results in reinforcement of the diffractive and angular contributions at the second grating.

Figure 10:
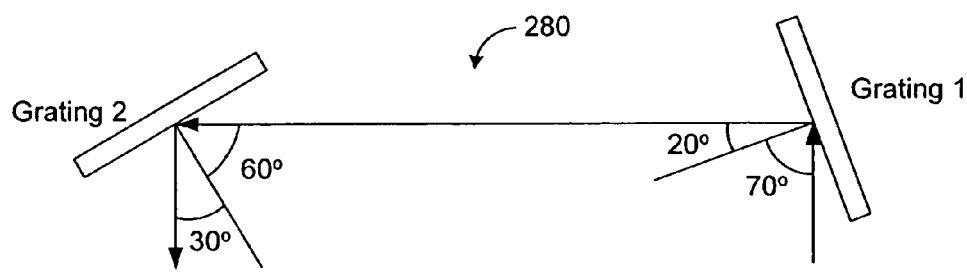
FIG. 10 schematically illustrates a specific example of the configuration of FIG. 8.

FIG. 10 shows a specific example 280 of the grating pair of FIG. 8, where reinforcement is not satisfied. The example diffraction geometry at the first grating is similar to that of FIG. 9. However, the second grating has incident and diffraction angles of approximately 60 and 30 degrees, resulting in the diffractive contribution working against the angular contribution at the second grating.

Figure 11:
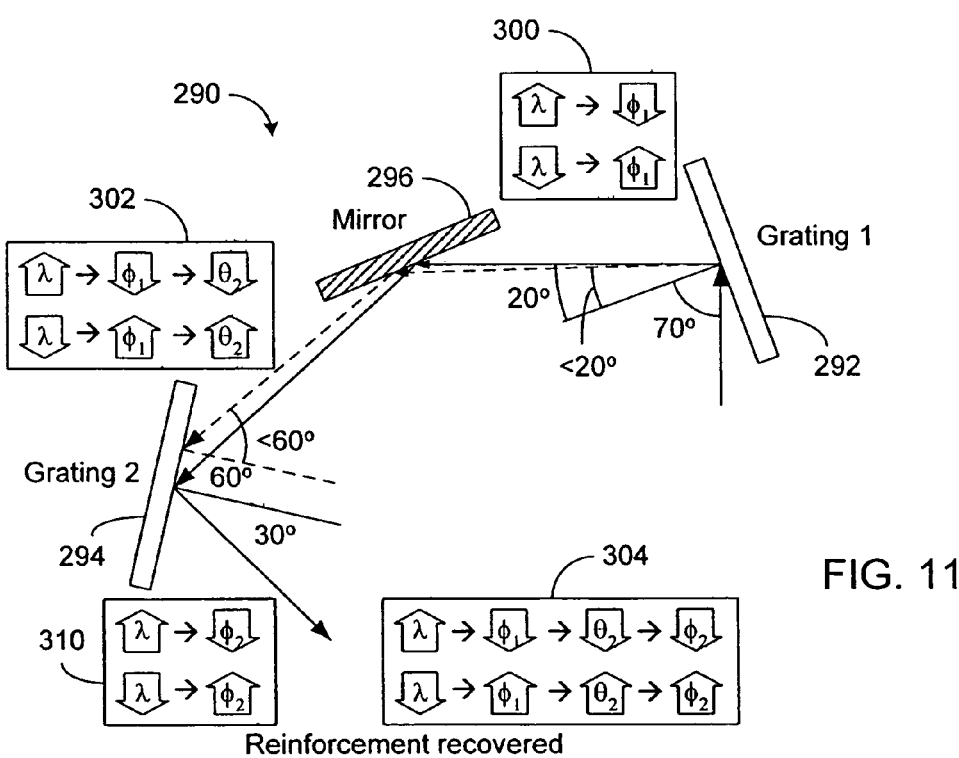
FIG. 11 schematically illustrates an example where reinforcement can be restored in an originally non-reinforcing configuration, by positioning a mirror between the two gratings.

For a given pair of gratings having first and second diffraction configurations yielding non-reinforcement (for example, 70/20-degree and 60/30-degree of FIG. 10), reinforcement can nevertheless be achieved by addition of a beam path altering element such as a mirror. FIG. 11 shows an example grating pair configuration 290 where a first grating 292 has an example diffraction configuration of 70/20-degrees (for the purpose of describing FIG. 11, "70/20" means 70 degree incident angle and 20 degree diffraction angle). A second grating 294 has an example diffraction configuration of 60/30. By themselves, these two grating configurations do not yield reinforcement, as seen in FIG. 10. However, a mirror 296 is shown to be positioned between the first and second gratings 292 and 294, and "restore" the reinforcement of the diffractive and angular contributions.

For the purpose of description of FIG. 11, an increase in the wavelength $\lambda$ and the resulting consequences are described. However, similar reinforcement restoration can be achieved when the wavelength is decreased.

As shown in a legend box 300, an increase in the wavelength $\lambda$ of the incident beam results in a decrease in the diffraction angle $\phi_1$. Thus, the diffraction angle from the first grating is shown to be less than the original example 20 degrees. As indicated in a legend box 302, such a decrease in the diffraction angle $\phi_1$ of the first grating 292 results in a decrease (as opposed to an increase in the absence of a mirror) in the incident angle $\theta_2$ to a value less than the original example 60 degrees. The decrease in the incident angle $\theta_2$ results in a decrease in the diffraction angle $\phi_2$ at the second grating 294, as indicated in a legend box 304. Also, because $\theta_2>\phi_2$, an increase in $\lambda$ results in a decrease in $\phi_2$ (indicated in a legend box 310). Thus, when the wavelength $\lambda$ increases, both of the diffractive and angular contributions decrease in a reinforcing manner.

Based on the foregoing, one can see that for a given pair of gratings, reinforcement can be such that an/a increase/decrease in wavelength results an/a increase/decrease in both diffractive and angular contributions (for example, FIGS. 7 and 9). Reinforcement can also be such that an/a increase/decrease in wavelength results in a/an decrease/increase in both diffractive and angular contributions (for example, FIG. 11). Such reinforcement can be achieved by addition of a mirror between the two gratings, as described above in reference to FIG. 11.

FIGS. 12 and 13 show summaries of various configurations that can be implemented using a pair of neighboring gratings. In FIG. 12A, a grating pair 320 is shown to include a first grating 322 (G1) yielding a diffraction order $m_1$. The grating pair 320 also includes a second grating 324 (G2) with a diffraction of order $m_2$. In one example convention, as previously described, m for a given grating is positive when $\theta<\phi$, zero when $\theta=\phi$, and negative when $\theta>\phi$. Thus based on such a convention, FIG. 12B shows a table 330 that lists the four possible combinations of diffraction orders of the two gratings G1 and G2. As shown in table 330, the principle of reinforcement is satisfied when $m_1$ and $m_2$ have opposite signs; however, reinforcement does not occur when $m_1$ and $m_2$ have the same sign. Thus in some embodiments, the two neighboring gratings G1 and G2 are arranged so that the resulting diffractions have opposing diffraction orders thereby satisfying the principle of reinforcement.

In FIG. 13A, a grating pair 340 is shown to include a first grating 342 (G1) and a diffraction order $m_1$. The grating pair 340 also includes a second grating 344 (G2) with a diffraction order $m_2$. The grating pair 340 is also shown to include a mirror 346 in an optical path between the two gratings G1 and G2. Based on the example diffraction order convention of FIG. 12B, FIG. 13B shows a table 350 that lists the four possible combinations of diffraction orders of the two gratings G1 and G2. As shown in table 350, the principle of reinforcement is satisfied when $m_1$ and $m_2$ have the same sign; however reinforcement does not occur when $m_1$ and $m_2$ have different signs. Thus in some embodiments, the two neighboring gratings G1 and G2 configured for same-sign diffractions can yield reinforcement by use of a mirror along a path between the two gratings.

Figure 14:
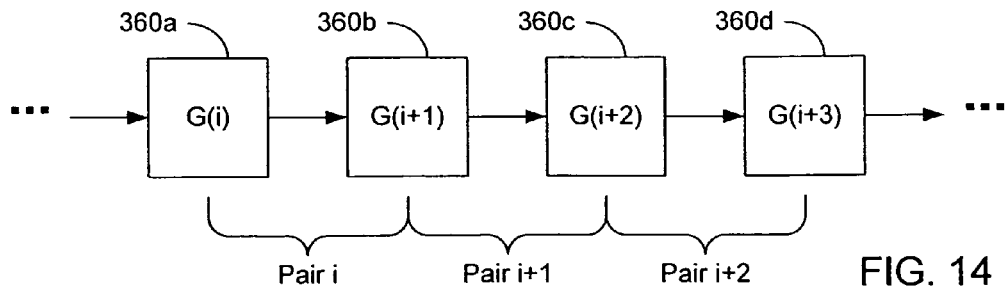
FIG. 14 is a block diagram schematically illustrating a grating assembly having a plurality of gratings, where each neighboring pair is configured to reinforce the diffractive and angular contributions.

FIG. 14 shows that in one embodiment, a Sagnac interferometer can include a plurality of gratings 360. The gratings 360 can be grouped as neighboring pairs. Thus, gratings 360a and 360b can be paired as pair "i," 360b and 360c as pair "i+1," and so on. In one embodiment, each pair of the one or more pairs of neighboring gratings is configured so that reinforcement occurs. One can see that such successive reinforcement can yield an increase overall value of the last diffraction angle, thereby allowing a greater deflection or displacement of the diffracted beam (transmissive and/or reflective) having wavelength $\lambda_o+\Delta\lambda$ with respect to a beam having the design wavelength $\lambda_o$. As described above in reference to FIGS. 11 and 13, such reinforcement can be achieved by use of a mirror between the two neighboring gratings. Thus, a reinforcing "pair" of gratings may or may not include a mirror. Note that in certain embodiments, not all of the pairs of gratings satisfy the principle of reinforcement. In certain embodiments, for example, one or more pairs may satisfy the principle of reinforcement while one or more pairs may not satisfy the principle of reinforcement. In certain embodiments, however, more of the pairs satisfy the principle of reinforcement than do not.

Figure 15:
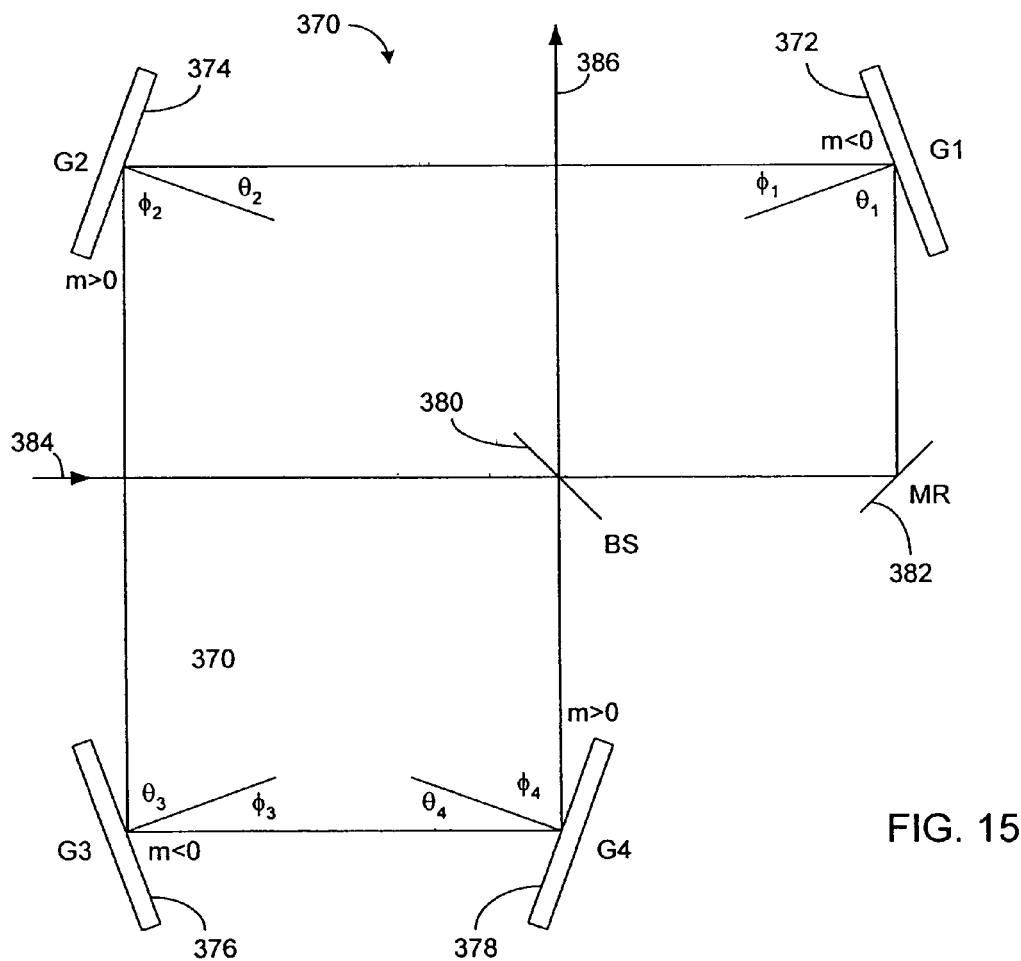
FIG. 15 schematically illustrates one embodiment of a four-grating Sagnac interferometer where each of the neighboring pairs of gratings is configured to provide reinforcement.

FIG. 15 shows one embodiment of an interferometer 370 having four gratings G1, G2, G3, and G4 (372, 374, 376, and 378). Gratings G1 and G3 are shown to have negative diffraction orders, and gratings G2 and G4 are shown to have positive diffraction orders. Thus, the diffraction orders are opposite among any pair of neighboring gratings. Since the example grating assembly does not have any mirror between gratings, opposite diffraction order signs yields reinforcement for a pair of neighboring gratings. Thus, G1 and G2 reinforce; G2 and G3 reinforce; and G3 and G4 reinforce.

The example overall-reinforcement in the grating assembly of FIG. 15 can facilitate enhanced capability for detecting a variation in the wavelength of an input beam 384. The interferometer 370 is shown to include a beamsplitter BS (380) that transmits a portion of the input beam 384 to a mirror MR (382) and then to a G1-G2-G3-G4 path, and reflects a portion of the input beam 384 to a G4-G3-G2-G1-MR path. The transmitted beam and the reflected beam again transmit through and reflect from, the beamsplitter, respectively, thereby forming the output beam 386.

If the wavelength of the input beam 384 changes, then each of the transmitted and reflected beams form the output beam 386 can have enhanced angular variation from the design-wavelength output beam axis. For example, the transmitted output beam's angular variation depends on the variation in the diffraction angle $\phi_4$ ($\Delta\phi_4$) of the grating G4, with $\Delta\phi_4$ being enhanced by cumulative reinforcements. Similarly, the reflected output beam's angular variation depends on the variation in the diffraction angle $\theta_1$ ($\Delta\theta_1$) of the grating G1, with $\Delta\theta_1$ being enhanced by cumulative reinforcements. (Note that the role of $\theta$ and $\phi$ are reversed for reflective beam path.)

As discussed above, for an optical beam having the design wavelength $\lambda_o$, generally no deviation is present and the reflected and transmitted beam overlap and follow the design-wavelength optical path or axis. However, in certain embodiments, the Sagnac interferometer can be used to measure the change in wavelength of the input beam, for example, from the design wavelength, by measuring the deviation of the transmitted and reflected beams from the design-wavelength optical path or axis (also referred to as a reference output axis herein). Increased sensitivity may be achieved when the deviations of the transmitted and reflected beams are on the opposite sides of the reference output axis. If the transmitted and reflected beams are on opposite sides of the reference output axis, the resolvability of wavelength components is increased. This affect is referred to herein as the principle of crossing. For the purpose of description, "the crossing condition" is said to be satisfied for such output deviations. If the deviated transmitted and reflected beams are on the same side of the design-wavelength optical axis, it may not be possible to accurately measure the deviation of either or both of the beams. For the purpose of description herein, "the crossing condition" is not satisfied for such deviations.

An example configuration demonstrating the principle of crossing is shown in FIG. 2. It should be noted that crossing and reinforcement are generally independent conditions. Crossing can be satisfied even when there is no reinforcement. For example, the grating assembly of FIG. 2 can be altered so that the second grating 120 is replaced with a mirror, thereby leaving only one grating 116 and removing the concept of grating-pair reinforcement. However, such a single-grating system can be configured so that the transmitted and reflected beams satisfy the crossing condition.

Figure 16:
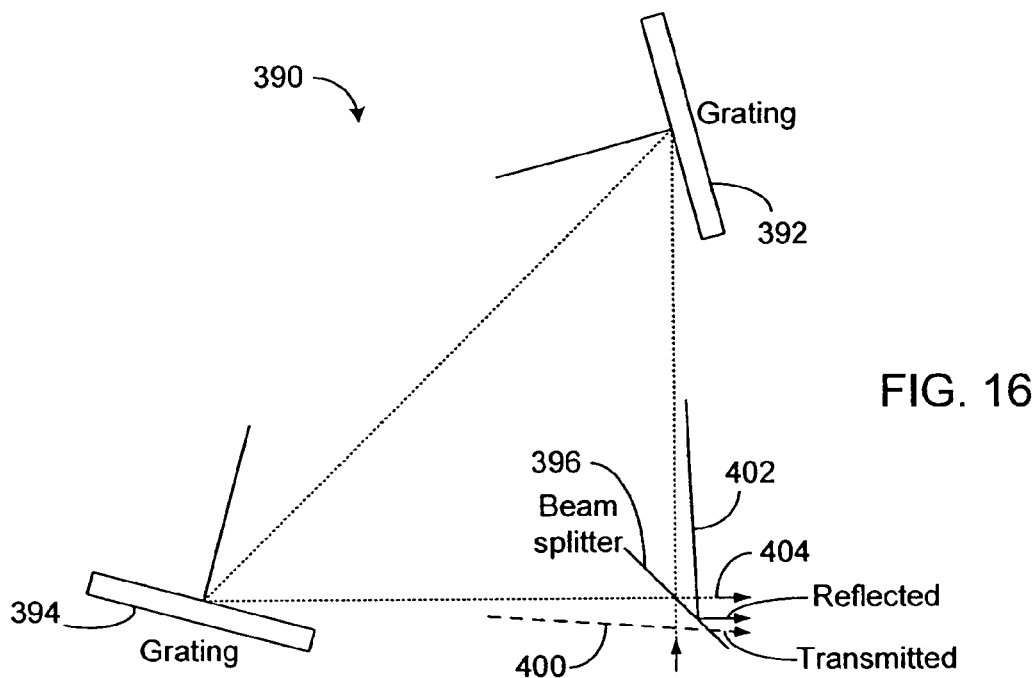
FIG. 16 schematically illustrates one embodiment of a Sagnac interferometer where the transmitted and reflected beams exit the grating assembly on the same side of a reference beam axis defined by a design wavelength beam.

On the other hand, crossing may not be satisfied even if reinforcement is satisfied in an interferometer having a plurality of gratings. FIG. 16 shows one embodiment of an example interferometer 390 having two gratings 392 and 394 arranged so as to facilitate reinforcement of the transmitted and reflected beams 400 and 402. However, the transmitted and reflected beams 400 and 402 are on the same side of the reference output axis 404 emerging from a beamsplitter 396, such that the crossing condition is not satisfied.

Figure 17:
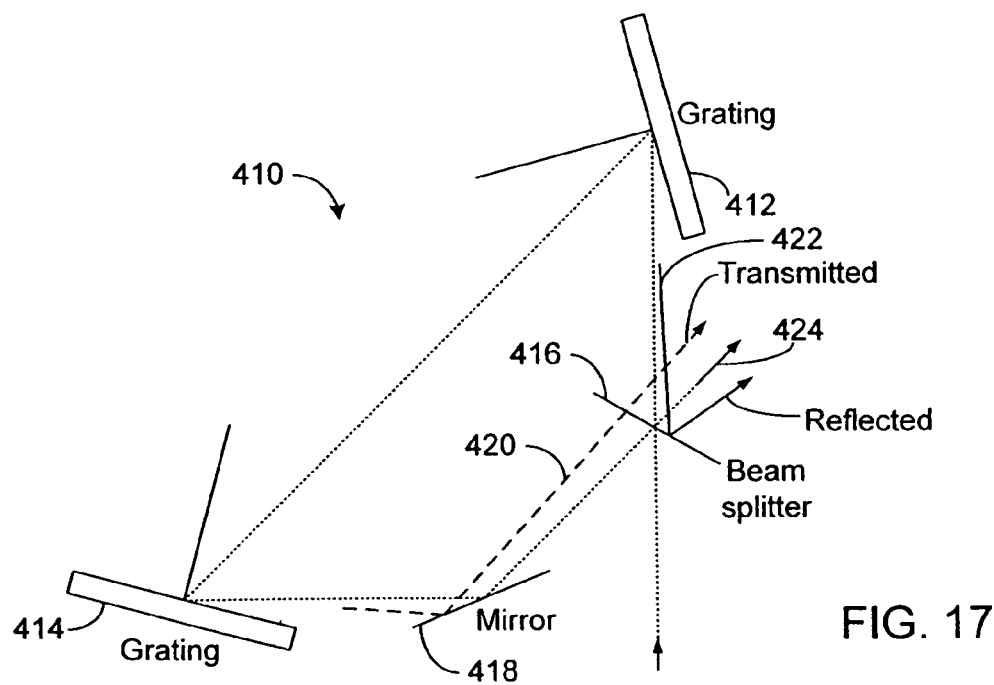
FIG. 17 schematically illustrates one embodiment of a Sagnac interferometer where the transmitted and reflected beams exit the grating assembly on the opposite sides of the reference beam axis, thereby satisfying the "crossing" condition.

FIG. 17 shows how the reinforcing diffraction configuration of FIG. 16 can be made to satisfy the crossing condition. An example interferometer 410 is shown to have first and second gratings 412 and 414 that are configured substantially similar to the example interferometer 390 of FIG. 16. In the interferometer 410, however, a mirror 418 is positioned between the second grating 414 and a beamsplitter 416. The mirror 418 is shown to position the transmitted beam 420 and the reflected beam 422 on opposite sides of the reference output axis 424, thereby satisfying the crossing condition.

In some embodiments, as described above, gratings of an interferometer are configured so as to yield an overall reinforcement of the diffractive and angular contributions. If reinforcement is not satisfied for a given pair of gratings, reinforcement can be restored by adding a mirror between the gratings. In general, addition of an odd number of mirrors (or reflective surfaces) between a pair of gratings can restore reinforcement when reinforcement is originally not satisfied.

In some embodiments, if crossing condition is satisfied for an interferometer, no mirror is added between the beamsplitter and the nearest grating in either direction. However, if crossing is not satisfied, addition of a mirror between the beamsplitter and the nearest grating can restore the crossing condition. In general, addition of an odd number of mirrors (or reflective surfaces) between a beamsplitter and a nearest grating in either direction can restore the crossing condition when crossing is originally not satisfied.

Figure 18:
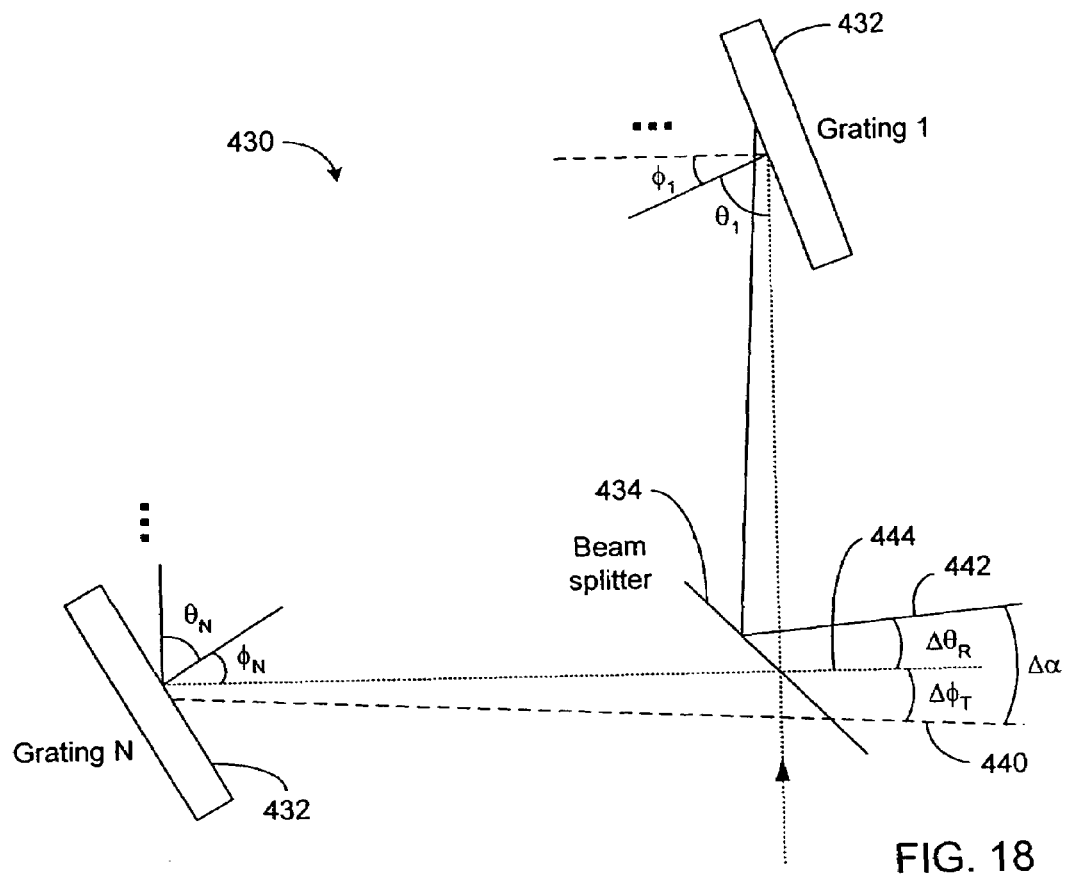
FIG. 18 schematically illustrates that when the crossing condition is met, a crossing angle can be obtained by summing the deviation angles of the transmitted and reflected beams exiting the grating assembly.

In some embodiments, preferably both reinforcement and crossing conditions are satisfied. FIG. 18 shows one embodiment of an interferometer having N gratings 432 arranged to yield an overall reinforced deviation $\Delta\phi_T$ of the transmitted beam 440 and an overall reinforced deviation $\Delta\theta_R$ of the reflected beam 442, both with respect to the reference output axis 444. As discussed above and as shown in FIG. 18, for the reflected beam $\phi$ and $\theta$ represent the incident and diffracted angles, respectively; hence the deviation of the reflected beam corresponds to $\Delta\theta_R$. As shown, the deviations $\Delta\phi_T$ and $\Delta\theta_R$ form a crossing angle $\Delta\alpha$ on the output side of the beamsplitter 434.

Figure 19:
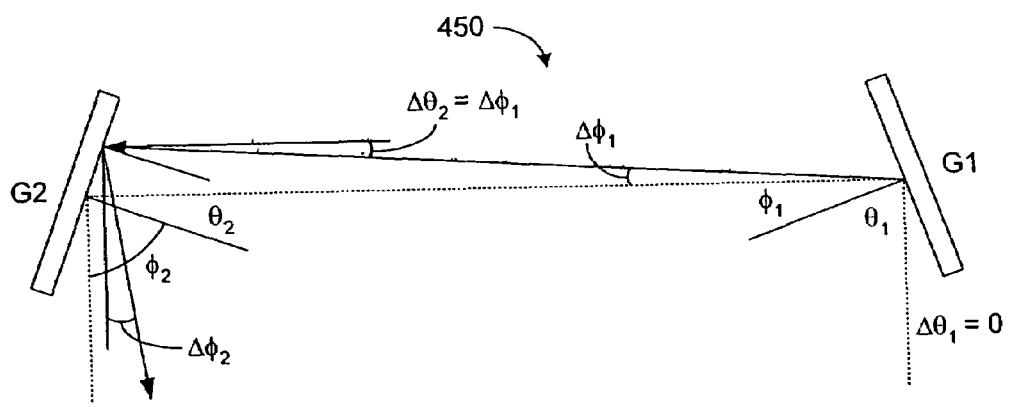
FIG. 19 schematically illustrates how the deviation angle can be determined for the transmitted or reflected beams.

For N gratings, the crossing angle $\Delta\alpha$ due to a deviation in wavelength ($\Delta\lambda$) can be calculated by considering the reinforcing contributions at each pair of the N gratings. FIG. 19 shows an example beginning pair 450 (for the transmitted beam) of gratings G1 and G2. At G1, the incident angle deviation $\Delta\theta_1$ is substantially zero, and the diffraction angle deviation $\Delta\phi_1$ is due to $\Delta\lambda$. At the second grating G2, $\Delta\theta_2$ is substantially equal to $\Delta\phi_1$, and $\Delta\phi_2$ due to $\Delta\theta_2$ and $\Delta\lambda$ is in turn substantially equal to $\Delta\theta_3$, the incident angle deviation for the next grating (not shown).

Based on the foregoing, and based on Equation 2, the diffractions at G1, G2, and the N-th grating can be characterized as follows:

$$\Delta\theta_1 = 0;$$

$$\Delta\phi_1 = (\Delta\lambda/\cos\phi_1)(m_1/g_1);$$

$$\Delta\theta_2 = \Delta\phi_1;$$

$$\Delta\phi_2 = (\Delta\lambda/\cos\phi_1\cos\phi_2)((m_2/g_2)\cos\phi_1 + (m_1/g_1)\cos\theta_2);$$

$$\Delta\theta_N = \Delta\phi_{N-1};$$

$$\Delta\phi_N = \frac{\Delta\lambda}{\prod_{i=1}^{N}\cos\phi_i} \sum_{j=1}^{N}\left(\frac{|m_j|}{|g_j|}\prod_{k=1}^{j-1}\cos\phi_k\prod_{l=j+1}^{N}\cos\theta_l\right).$$

Note that $\Delta\phi_N = \Delta\phi_T$ in FIG. 18. Similarly for the reflecting beam, $$\Delta\theta_T = \frac{\Delta\lambda}{\prod_{i=1}^{N}\cos\theta_i} \sum_{j=1}^{N}\left(\frac{|m_j|}{|g_j|}\prod_{k=1}^{j-1}\cos\phi_k\prod_{l=j+1}^{N}\cos\theta_l\right).$$

Since $\Delta\alpha = \Delta\phi_T + \Delta\theta_R$, the crossing angle $\Delta\alpha$ for the deviation $\Delta\lambda$ can be expressed as $$\Delta\alpha/\Delta\lambda = \left(\frac{1}{\prod_{i=1}^{N}\cos\theta_i} + \frac{1}{\prod_{i=1}^{N}\cos\phi_i}\right) \sum_{j=1}^{N}\left(\frac{|m_j|}{|g_j|}\prod_{k=1}^{j-1}\cos\phi_k\prod_{l=j+1}^{N}\cos\theta_l\right). \quad (3)$$

Equation 3 that expresses the crossing angle $\Delta\alpha$ due to the wavelength deviation $\Delta\lambda$ is valid for designs that use reflective gratings, transmissive gratings, or any combination thereof. In the particular form of Equation 3, the "+" sign in the bracket before the summation sign assumes that the crossing principle is satisfied, and the absolute value signs for $m_j$ and $g_j$ assume that the reinforcement principle is satisfied at each pair of gratings. It will be understood that other configurations are possible (for example, where one of the crossing and reinforcement principles are satisfied, but not both). Thus, the quantity $\Delta\alpha/\Delta\lambda$ (or related quantities) can be expressed accordingly. Note that the above analysis illustrates the basic theory to first order in $\Delta\lambda$, $\Delta\theta$ and $\Delta\phi$. Other analyses are also possible based on higher orders of the differentials appearing in equation (2), and they can provide a higher order correction to equation (3).

In some embodiments, a resolving power $\eta$ of the interferometer is defined as $\lambda/\Delta\lambda$, and can be expressed as $$\eta = L(\Delta\alpha/\Delta\lambda), \quad (4)$$

where L is the transverse length of the illuminated portion of the detector (array in one embodiment), and $\Delta\alpha/\Delta\lambda$ is given by Equation 3. Expressed as Equation 4, the resolving power $\eta$ corresponds to the crossing angle between the transmitted and reflected beam paths in the output portion that subtends approximately one wavelength of light across the illuminated portion of the detector.

Figure 20:
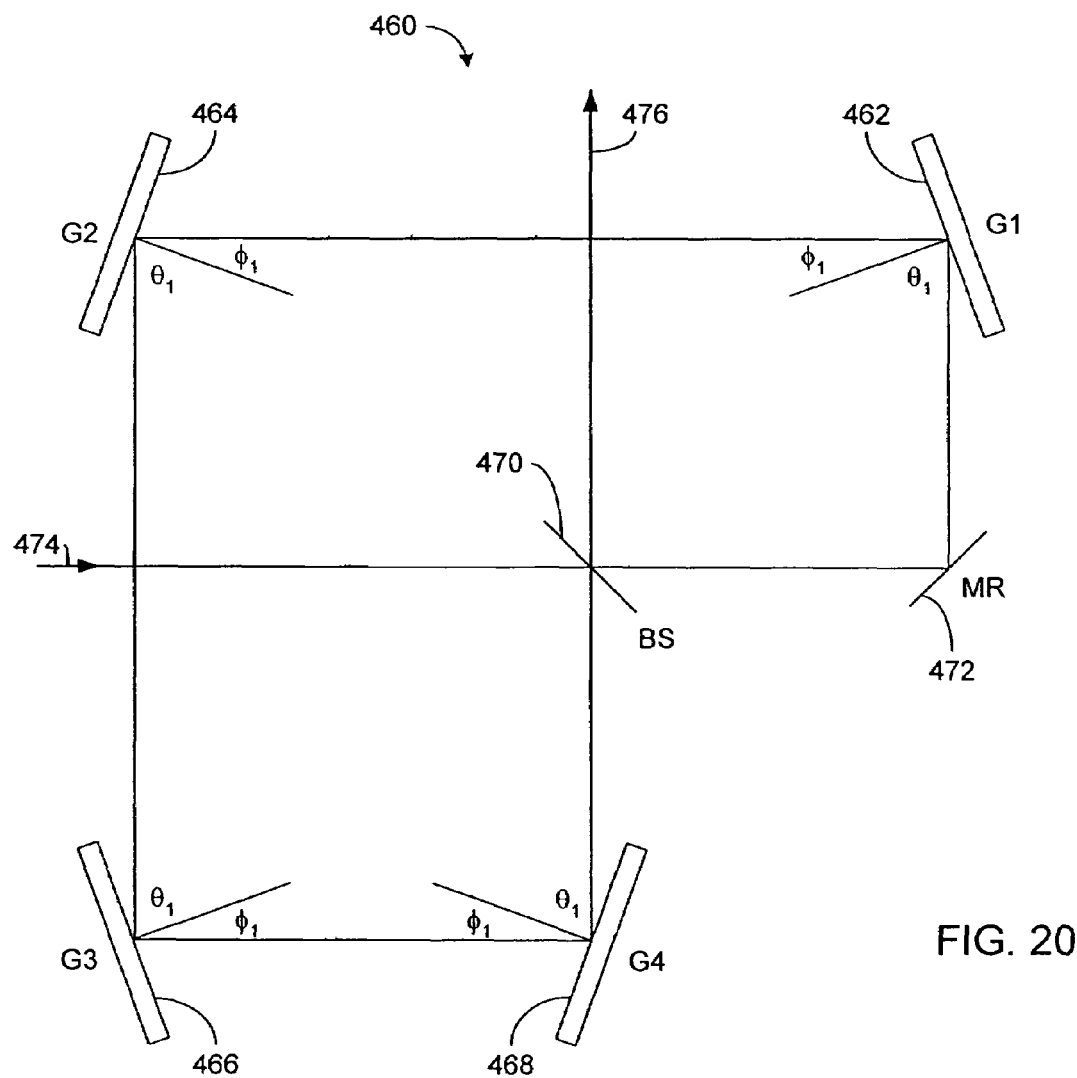
FIG. 20 schematically illustrates one embodiment of a four-grating Sagnac interferometer where reinforcement and crossing conditions are met, and where the incident and diffractive angles are symmetric so as to allow simplified design and determination of the interferometer's resolving power.

FIG. 20 shows one embodiment of an interferometer 460 that is a specific example of the interferometer 370 of FIG. 15. The gratings G1, G2, G3, and G4 (462, 464, 466, and 468) are selected and oriented such that adjacent gratings in an optical path are symmetric about an axis of symmetry. For example, G1 and G2 have substantial reflection symmetry with respect to an axis of symmetry that extends between G1 and G2. Similarly, G2 and G3 have substantial reflection symmetry with respect to an axis of symmetry that extends between G2 and G3. Similarly, G3 and G4 have substantial reflection symmetry with respect to an axis of symmetry that extends between G3 and G4. This arrangement provides substantially symmetric relationship among the incident and diffraction angles wherein the incident and diffraction angles of adjacent gratings are the same: $\theta_i = \phi_{i+1}$, and $\phi_i = \theta_{i+1}$. Thus, $\theta_1$ that is greater than $\phi_1$ is the incident angle for G1 and G3, and the diffraction angle for G2 and G4 as shown in FIG. 20. Similarly, $\phi_1$ is the diffraction angle for G1 and G3, and the incident angle for G2 and G4. Moreover, all four gratings have a common grating period of $g=g_i$, and a common magnitude of the diffraction orders $m=|m_i|$.

The interferometer 460 in FIG. 20 facilitates reinforcement and crossing of the transmitted and reflected beams from the input beam 474, relative to the reference output beam 476. Because of the symmetric relationship which yields the result that $\theta_i = \phi_{i+1}$, $\phi_i = \theta_{i+1}$, the resolving power $\eta$ of the interferometer 460 can be expressed as $$\eta = (2mLN)/(g\cos\theta_1). \quad (5)$$

Note that in Equation 5, the resolving power does not depend explicitly on $\phi_1$. In one embodiment, the gratings are designed to operate close to the Littrow configuration at large incident angles $\theta_1$, resulting in a large value for $1/\cos\theta_1$. In one embodiment, the ratio $m/g$ can also be made large, thereby resulting in a large value for the resolving power $\eta$.

Also note that the symmetric design of the interferometer 460 also substantially matches the beam size of the transmitted and reflected beams without the use of beam shaping elements such as a telescope. Additional details about beam shaping elements are described below in greater detail.

Figure 21:
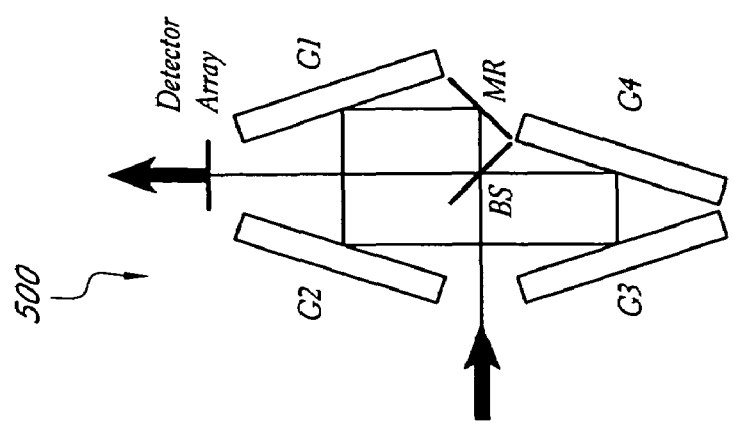
FIG. 21 schematically illustrates one embodiment of the interferometer of FIG. 20, where a detector is positioned to receive the beams exiting from the grating assembly.

FIGS. 21 to 25 show various example embodiments of a Sagnac interferometer utilizing different numbers of gratings with symmetrically arranged gratings, so as to provide the reinforcement and crossing conditions as described herein. As shown in each of these figures, adjacent gratings are symmetric about respective axes of symmetry between the gratings. FIG. 21 shows one embodiment of a four-grating assembly that is similar to the interferometer 460 of FIG. 20.

Figure 22:
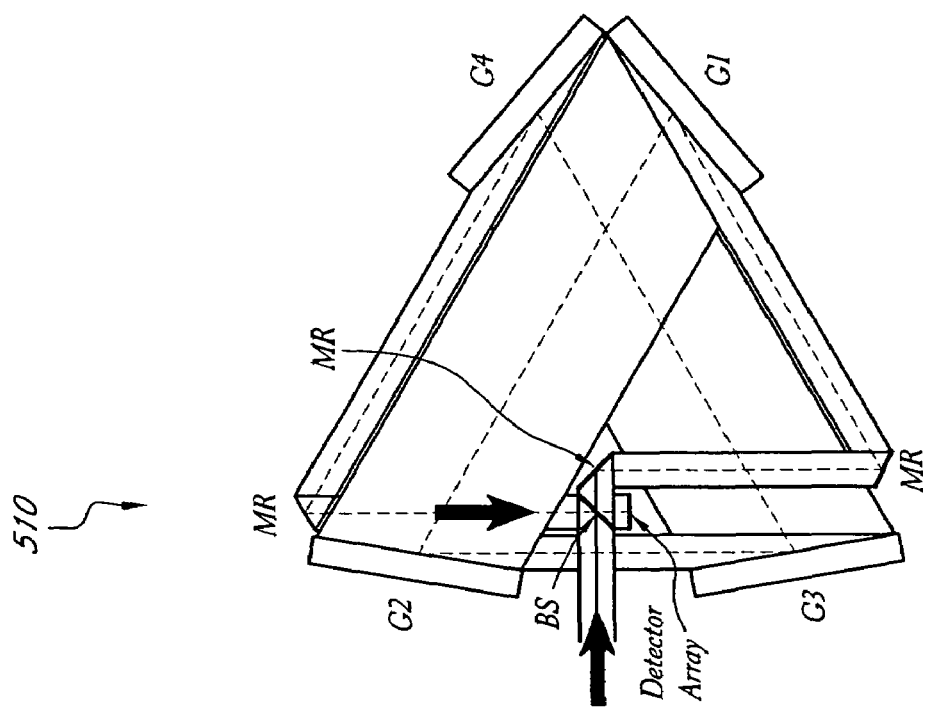
FIG. 22 schematically illustrates one embodiment of a variation in the four-grating symmetric interferometer.

FIG. 22 shows one embodiment of a symmetric four-grating interferometer 510, where the four gratings G1, G2, G3, and G4 are arranged differently than that of FIG. 21. In the example interferometer 510, each of the four gratings provides diffraction with approximately 60 degrees between the incident and diffracted beams. As shown in FIG. 22, the interferometer 510 can be configured so that the beamsplitter and the detector array can be positioned inside a volume defined by the four gratings.

Figure 23:
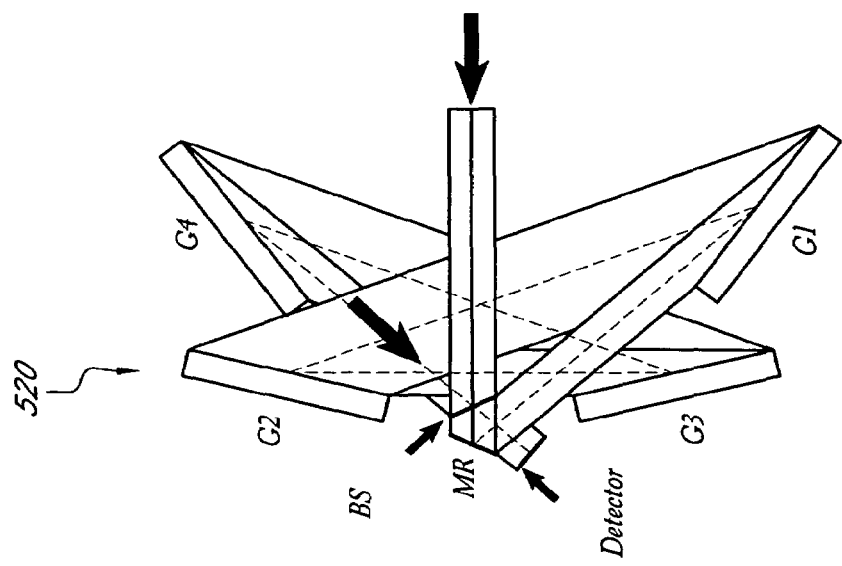
FIG. 23 schematically illustrates one embodiment of another variation in the four-grating symmetric interferometer.

FIG. 23 shows one embodiment of a symmetric four-grating interferometer 520, where the four gratings G1, G2, G3, and G4 are arranged yet in another different configuration. In the example interferometer 520, each of the four gratings provides diffraction with approximately 20 degrees between the incident and diffracted beams.

Figure 24:
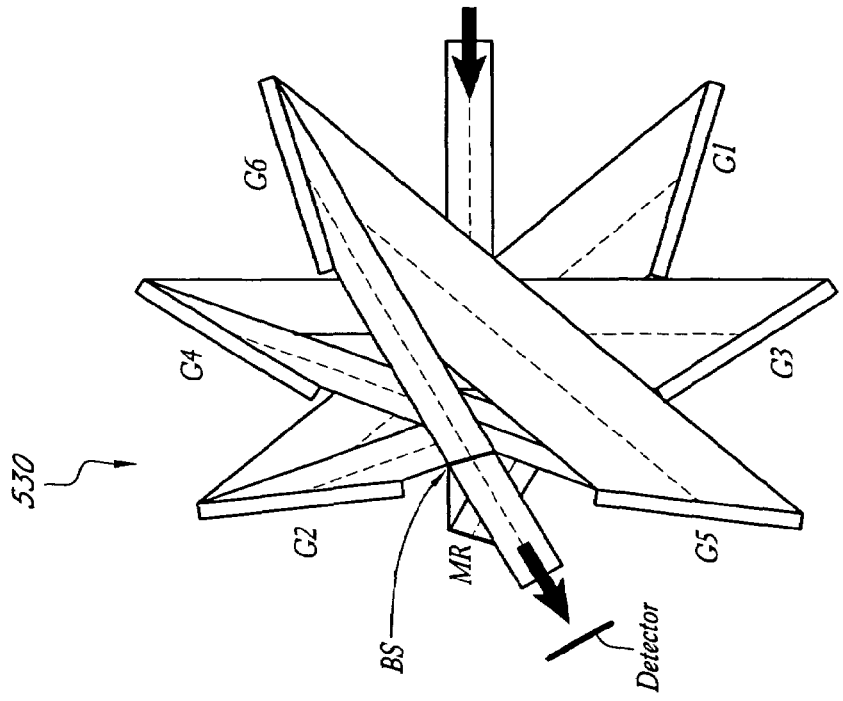
FIG. 24 schematically illustrates one embodiment of a six-grating symmetric interferometer.

FIG. 24 shows one embodiment of a symmetric six-grating interferometer 530, where the beamsplitter, mirror, detector, and four (G2, G3, G4, and G5) of the six gratings are arranged similar to that of the four-grating interferometer 520 of FIG. 23. Two additional gratings (G1 and G6) are shown to be added to form the six-grating configuration. In the example interferometer 530, each of the four gratings provides diffraction with approximately 20 degrees between the incident and diffracted beams.

Figure 25:
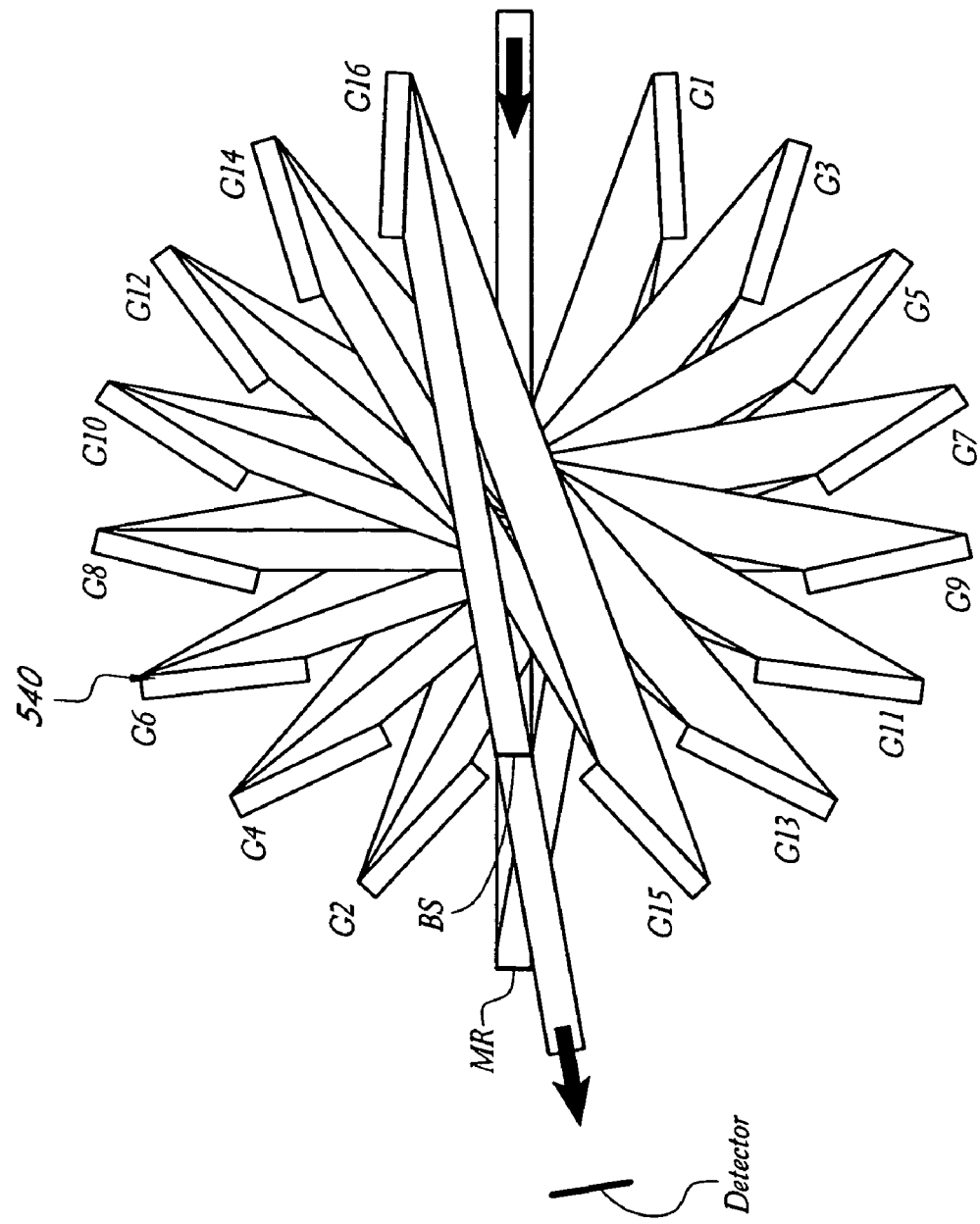
FIG. 25 schematically illustrates one embodiment of a sixteen-grating symmetric interferometer.

FIG. 25 shows one embodiment of a symmetric 16-grating interferometer 540, where the beamsplitter, mirror, detector, and six (G2, G4, G6, G11, G13, and G15) of the 16 gratings are arranged similar to that of the six-grating interferometer 530 of FIG. 24. Ten additional gratings (G1, G3, G5, G7, G9, G8, G10, G12, G14, and G16) are shown to be added to form the 16-grating configuration. In the example interferometer 540, each of the 16 gratings provides diffraction with approximately 10 degrees between the incident and diffracted beams.

Figure 26:
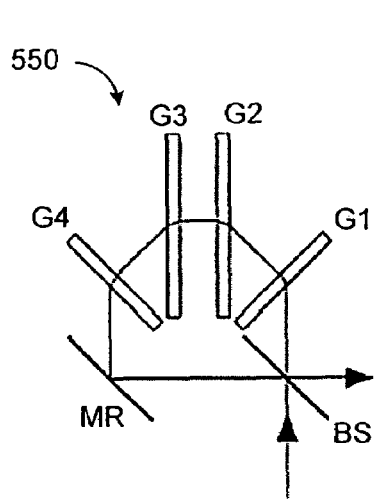
FIG. 26 schematically illustrates one embodiment of a four-transmissive-grating symmetric interferometer.
Figure 27:
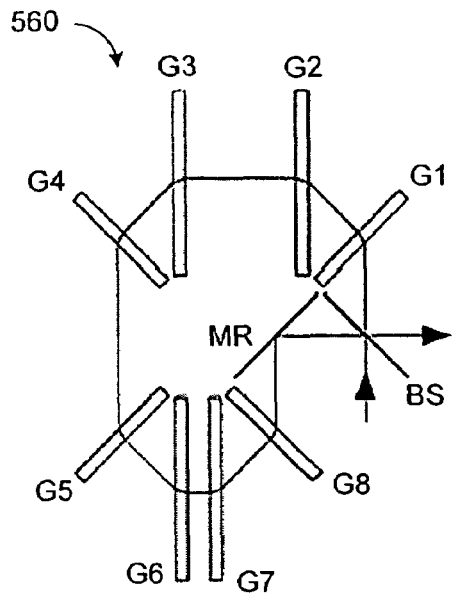
FIG. 27 schematically illustrates one embodiment of an eight-transmissive-grating symmetric interferometer.

FIGS. 26 to 28 show various example embodiments of a Sagnac interferometer having a plurality of transmissive gratings. As described above, reinforcement and crossing conditions can be applied to the transmissive gratings as well.

FIG. 26 shows one embodiment of an interferometer 550 having four transmissive gratings G1-G4. For the transmitted beam (counterclockwise beam), the G1/G2 pair satisfies reinforcement since an increase in $\lambda$ at G1 results in a decrease in $\phi_1$, which in turn decreases $\theta_2$ and $\phi_2$ (thus reinforcing the decrease in $\phi_2$ upon increase in $\lambda$ at G2). Similarly, the G2/G3 pair satisfies reinforcement since an increase in $\lambda$ at G2 results in a decrease in $\phi_2$, which in turn decreases $\theta_3$ and $\phi_3$ (thus reinforcing the decrease in $\phi_3$ upon increase in $\lambda$ at G3). Similarly, the G3/G4 pair satisfies reinforcement since an increase in $\lambda$ at G3 results in a decrease in $\phi_3$, which in turn decreases $\theta_4$ and $\phi_4$ (thus reinforcing the decrease in $\phi_4$ upon increase in $\lambda$ at G4).

FIG. 27 shows one embodiment of an interferometer 560 having eight transmissive gratings G1-G8. The first four gratings G1-G4 are configured generally similar to that of the interferometer 550 of FIG. 26, and the last four gratings G5-G8 are extensions that are also configured similarly.

Figure 28A:
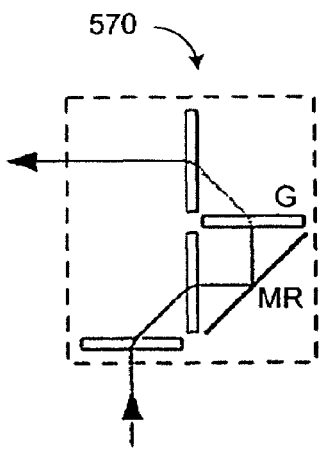
FIGS. 28A-28C show different example embodiments of transmissive grating assemblies that provide substantially equivalent function of a reflective grating.
Figure 28B:
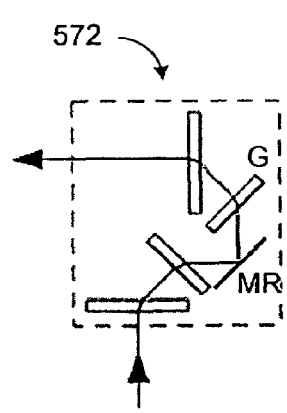
Figure 28C:
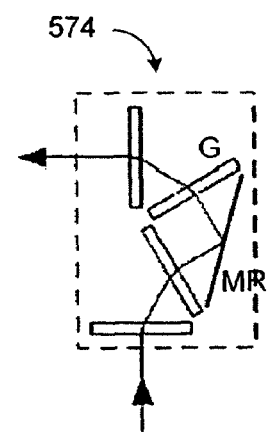

FIGS. 28A to 28C show three example embodiments of grating assemblies 570, 572, and 574 having transmissive gratings and mirrors. Each of the three example grating assemblies includes four transmissive gratings with one mirror positioned between the second and third gratings, and provides a functional equivalent of a reflective grating.

Figure 29:
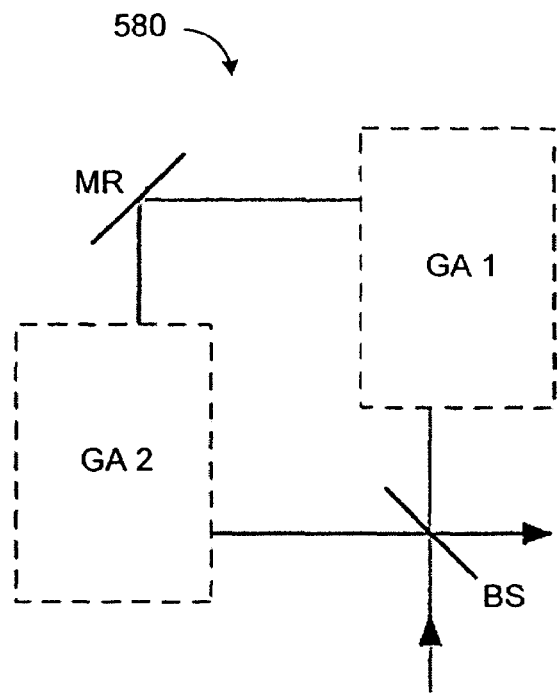
FIG. 29 schematically illustrates one embodiment of an interferometer having two reflective-like grating assemblies that can be formed by any of the example transmissive grating assemblies of FIGS. 28A-28C.
Figure 30:
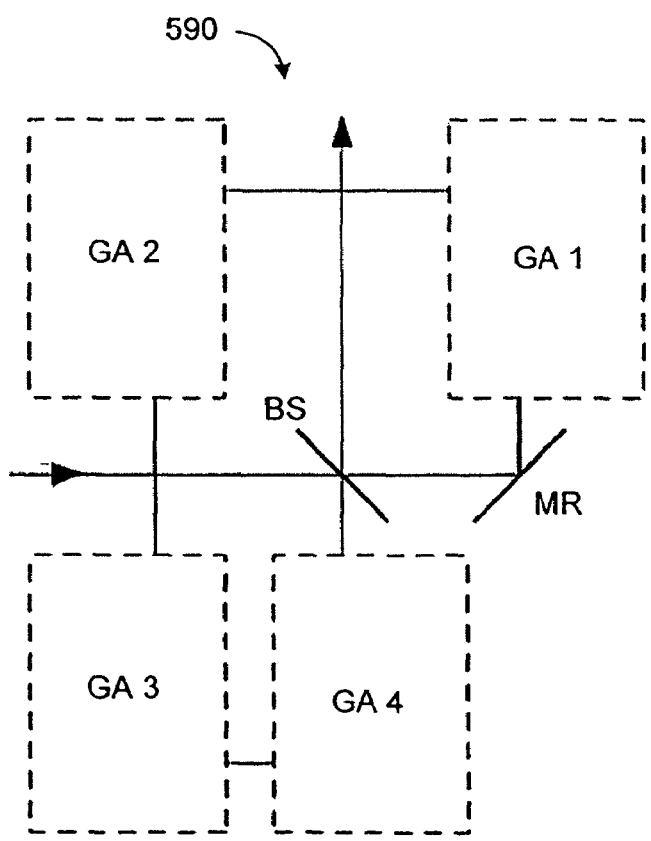
FIG. 30 schematically illustrates one embodiment of an interferometer having four reflective-like grating assemblies that can be formed by any of the example transmissive grating assemblies of FIGS. 28A-28C.

FIGS. 29 and 30 show example embodiments of interferometers having the transmissive grating assemblies configured to provide reflective grating functionalities. In one embodiment, an interferometer 580 includes two example grating assemblies GA1 and GA2 that are arranged similar to the reflective-grating interferometer of FIG. 2. Each of the grating assemblies GA1 and GA2 can be any of the example transmissive grating assemblies of FIGS. 28A-28C, or any other functionally similar assembly.

In one embodiment, as shown in FIG. 30, an interferometer 590 includes four grating assemblies GA1 to GA4 that are arranged similar to the reflective-grating interferometer of FIG. 15. Each of the grating assemblies GA1 and GA2 can be any of the example transmissive grating assemblies of FIGS. 28A-28C, or any other functionally similar assembly.

Figure 31:
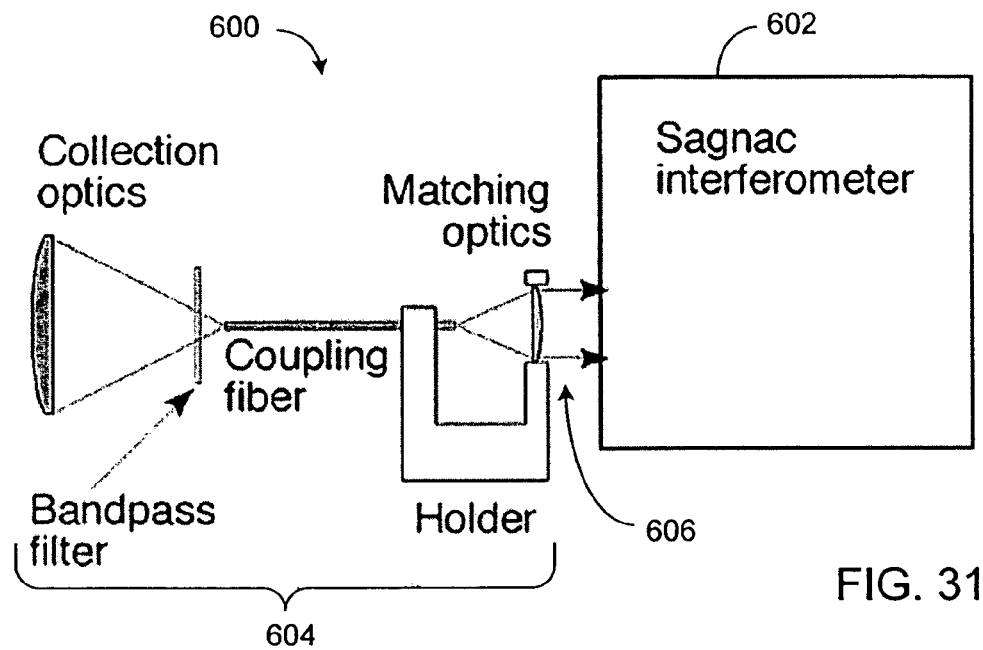
FIG. 31 schematically illustrates an example embodiment of how the input beam for the interferometer can be conditioned and delivered.

FIG. 31 shows one embodiment of an input beam configuration 600 that can be used to provide an input beam 606 to a Sagnac interferometer 602. As shown, an input assembly 604 can include a collection optics that collects light to be measured or monitored by the interferometer 602. In one embodiment, such collected light can be filtered using, for example, a bandpass filter. The filtered light is shown to be coupled to a coupling fiber and delivered to matching optics that in turn shapes the light as the input beam 606.

It will be understood that the input beam configuration of FIG. 31 is an example. Any one of a number of techniques for collecting, conditioning, matching, and the like, can be used to provide an input beam to the interferometer 602 having one or more features of the present disclosure.

Figure 32:
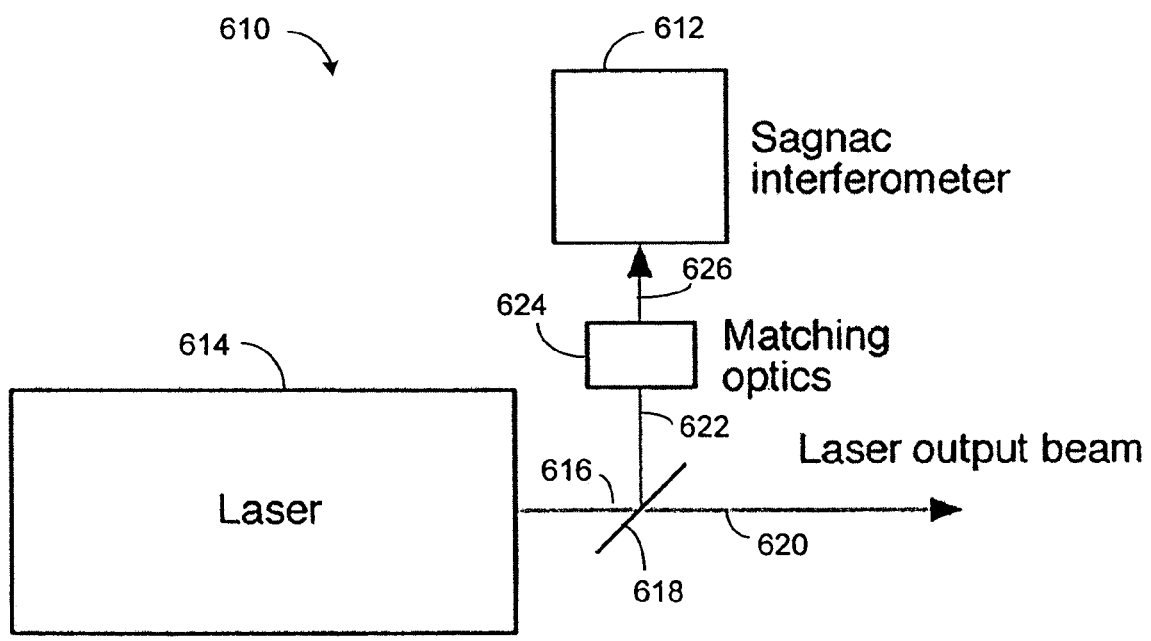
FIG. 32 schematically illustrates an example application of the Sagnac interferometer having one or more features of the present disclosure.

FIG. 32 shows an example application 610 where a Sagnac interferometer 612 can be used to monitor the performance of a laser 614. The increased sensitivity of the Sagnac interferometer 612 can be useful in determining the wavelength or wavelength spectra of the laser. The laser 614 is shown to emit an output beam 616 that impinges on a beamsplitter 618. A portion of the beam 616 is diverted as a monitor beam 622 that can be conditioned by matching optics 624 so as to provide an input to the Sagnac interferometer 612. As shown in FIG. 32, the output beam 616 is shown to continue through the beamsplitter 618 as an output beam 620.

By monitoring the laser 614, a change in the wavelength of the output beam 616 can be detected by the Sagnac interferometer as described herein. In some embodiments, deviated transmitted and reflected beams in the Sagnac interferometer, resulting from the wavelength shift, can be detected as spatially separated beams at a detector array having a sufficient coverage. By providing a relatively large separation due to reinforcement and crossing, the wavelength shift can be measured with greater accuracy. Moreover, in embodiments where a detector array having sufficient coverage is used, no scanning of the interferometer output is necessary; thus, a deviation measurement can be performed in "one shot" during a relatively short period of time.

In one embodiment, the foregoing measurement of wavelength deviation can be used to make an adjustment to the laser 614 or a related component so as to adjust the wavelength of the beam 616 to a desired value. In one embodiment, such monitoring of the deviation and resulting adjustment of the wavelength can be performed substantially real-time so as to provide a substantially stable laser output. For the purpose of description herein, "real-time" can include a time duration generally associated with a feedback control system that effectuates an adjustment in response to some measurement.

Figure 33:
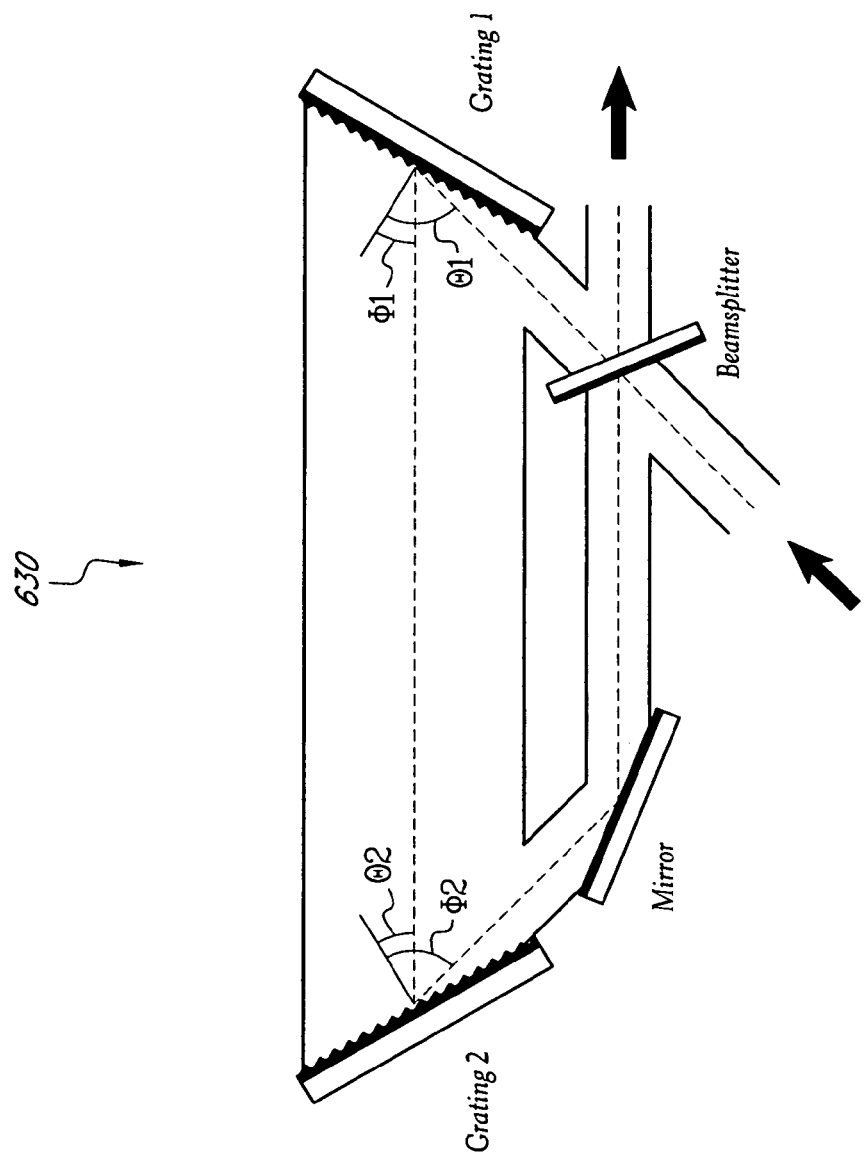
FIG. 33 schematically illustrates an example embodiment of a two-grating symmetric interferometer configured for large incident angles so as to allow for large resolving power.

FIGS. 33-41 show various features that can be incorporated into the various embodiments of the grating assemblies of the present disclosure. FIG. 33 shows an example embodiment of an interferometer 630 having two gratings, where the initial angles of incidence is relatively large. As described above in reference to Equation 5, such Littrow-regime configuration at large incident angles can, in conjunction with a large m/g, provide a large value for the resolving power $\eta$.

Figure 34:
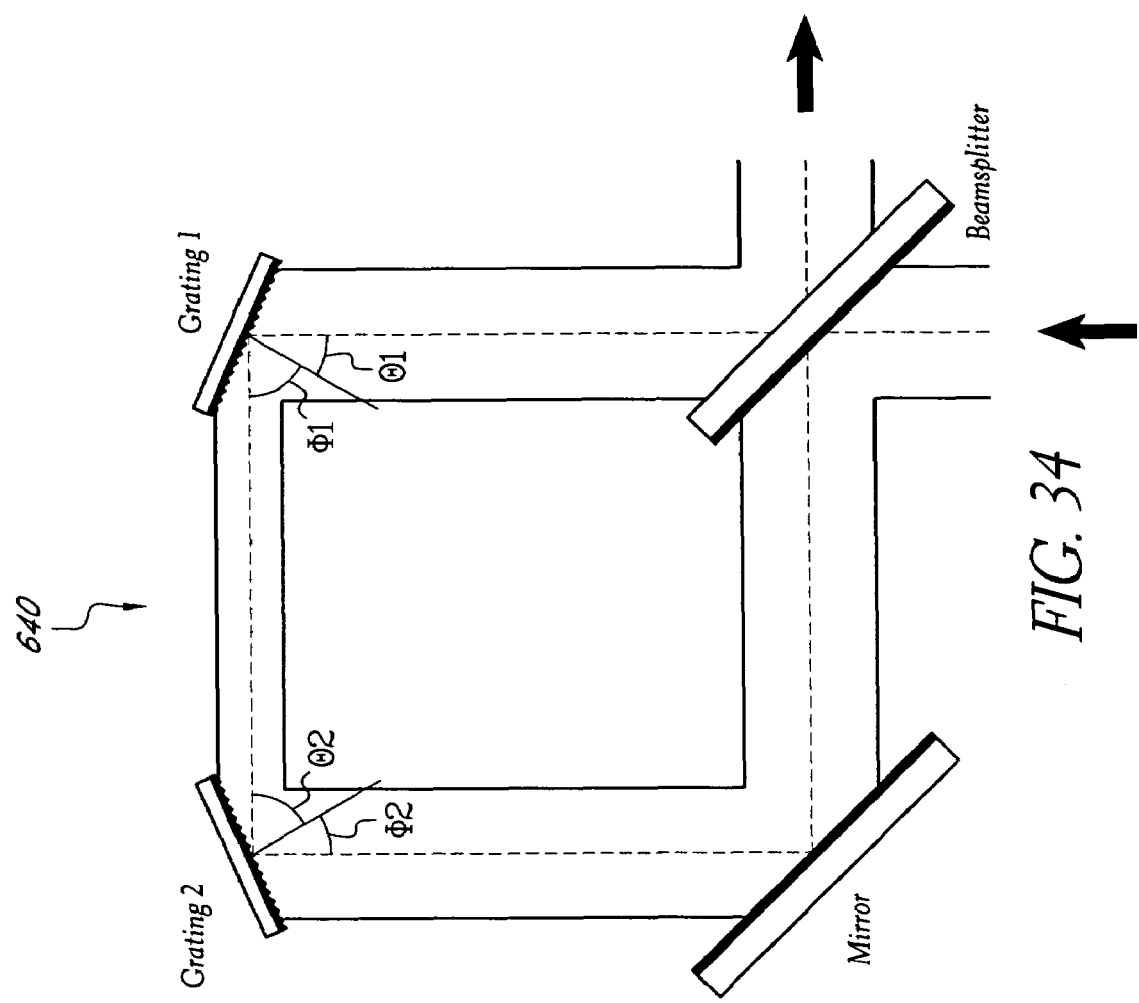
FIGS. 34 and 35 schematically illustrate that in some embodiments, similar two-grating symmetric interferometers can be configured so that one configuration has a greater incident angles, thereby providing a greater resolving power than the other configuration.
Figure 35:
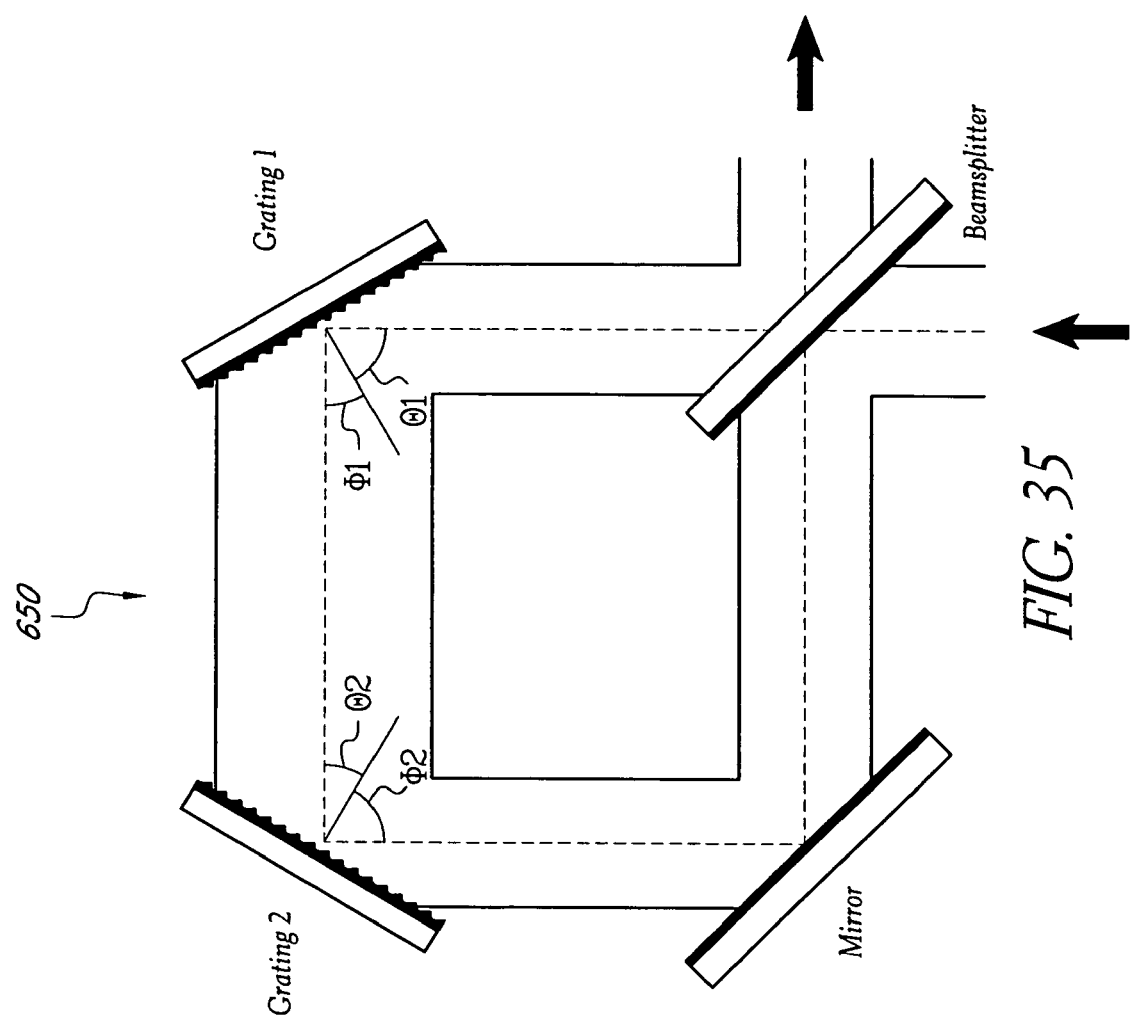

FIGS. 34 and 35 show examples of two-grating interferometers 640 and 650. Both interferometers satisfy the reinforcement and crossing conditions. However, the interferometer 650 of FIG. 35 is shown to have the initial incident angles ($\theta_1$ for the transmitted beam, and $\phi_2$ for the reflected beam) that are larger than those of the interferometer 640 of FIG. 34. As described above in reference to Equation 5, the resolving power for symmetric designs (as in FIGS. 34 and 35) can be expressed as $\eta=(2\,mLN)/(g\cos\theta_1)$, where $\eta$ increases as $\theta_1$ increases. Thus, if a higher resolving power is a desired design criteria, the example interferometer 650 of FIG. 35 could be chosen over the example interferometer 640 of FIG. 34.

Figure 36:
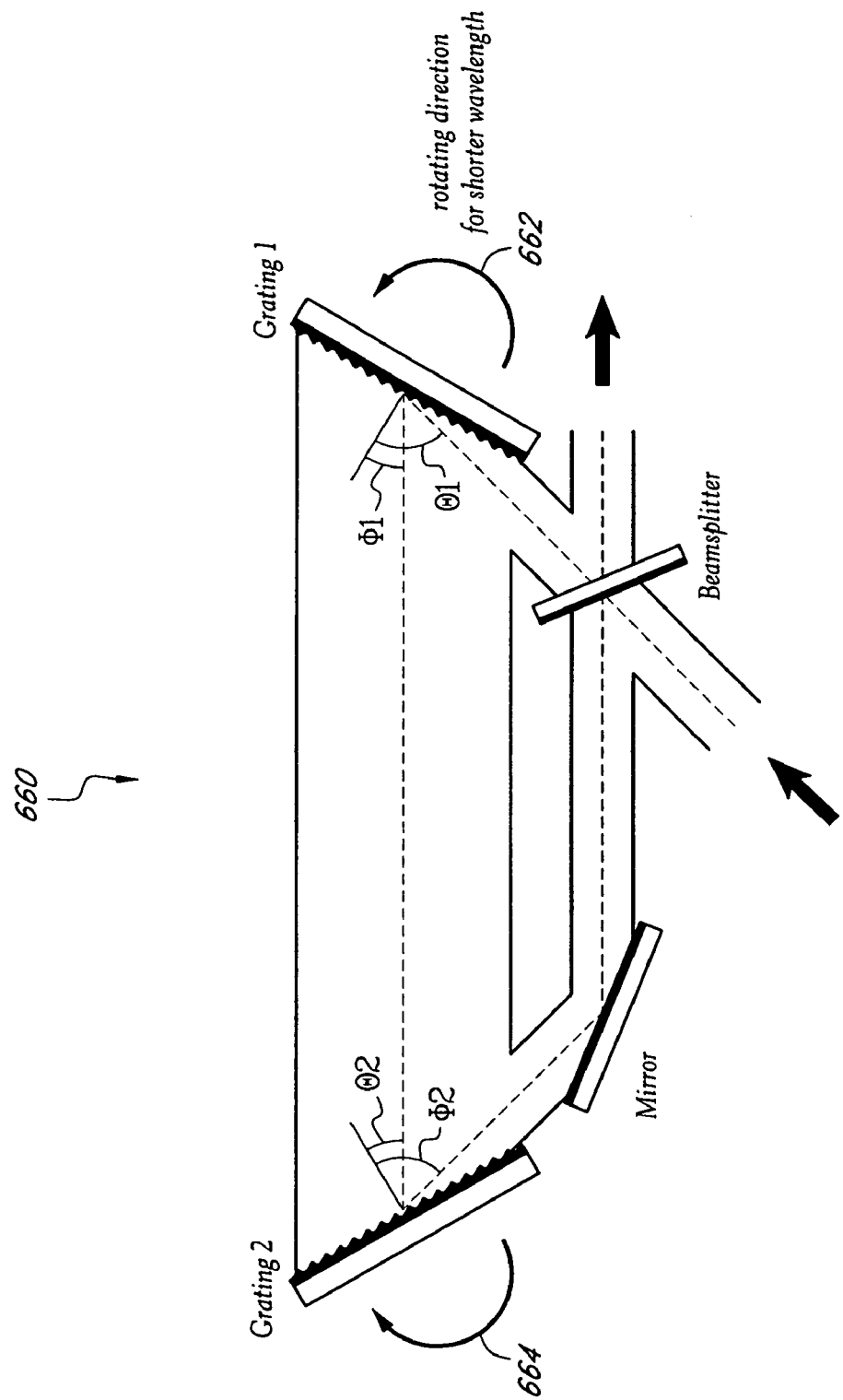
FIG. 36 schematically illustrates one embodiment of a Sagnac interferometer where at least one grating can be rotated to accommodate different operating wavelengths.

FIG. 36 shows one embodiment of a Sagnac interferometer 660 where at least one of the gratings can be rotated. In the interferometer 660, the first and second example gratings are depicted as being rotatable (arrows 662 and 664), thereby allowing the interferometer to operate at a range of spectral range without changing the gratings or the design beam path geometry. One or more actuators may be included to rotate the grating or gratings. Examples of actuators include motors and piezoelectric devices. Other types of actuators may also be employed.

Figure 37:
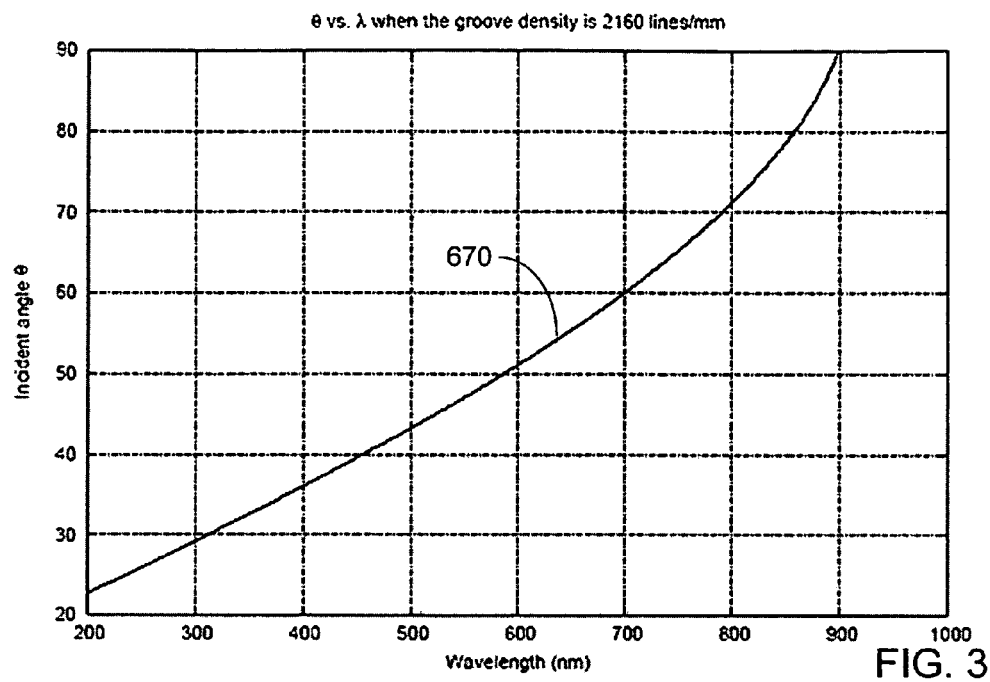
FIG. 37 is a plot of incident angle (in degrees) versus wavelength (in nanometers) that schematically illustrates an example of how the incident angle of a grating can vary with wavelength for a given grating period.
Figure 38:
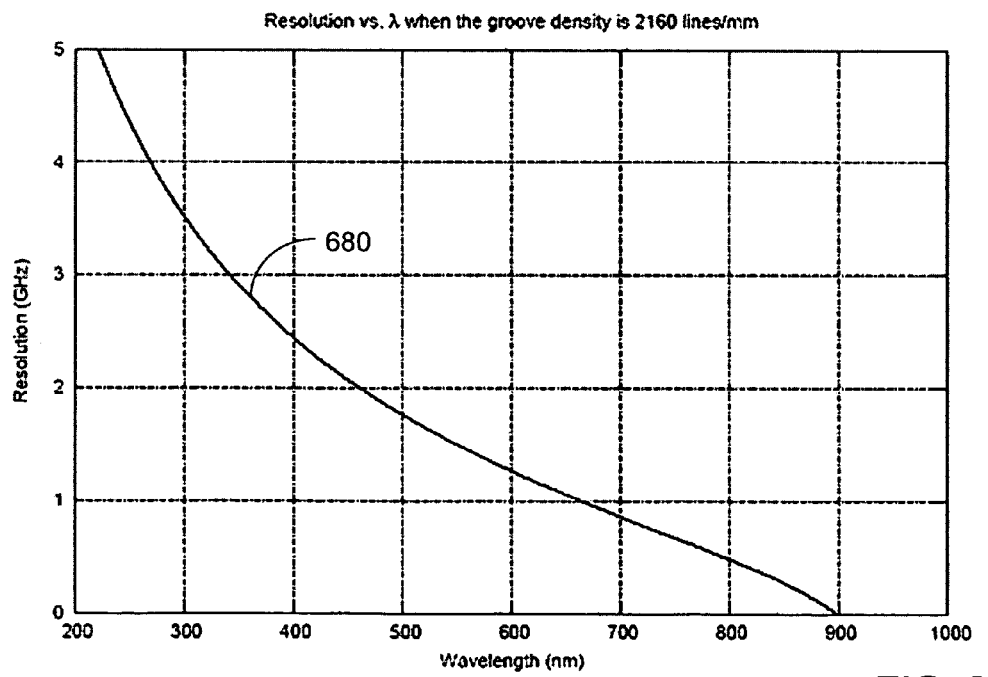
FIG. 38 plot of resolution (in GHz) versus wavelength (in nanometers) that schematically illustrates an example of how the resolution of a grating can vary with wavelength for a given grating period.

FIG. 37 shows an example relationship 670 between the incident angle θ and the wavelength λ. FIG. 38 shows an example relationship 680 between the resolution and the wavelength λ. Thus, with a tunable interferometer, such as the interferometer 660 of FIG. 36, one can begin by selecting a desired resolution, and then determining a corresponding wavelength using the curve 680. Then, a corresponding incident angle can be determined using the curve 670. The example first and second gratings of the interferometer 660 can then be rotated to the incident angle thus determined.

Figure 39:
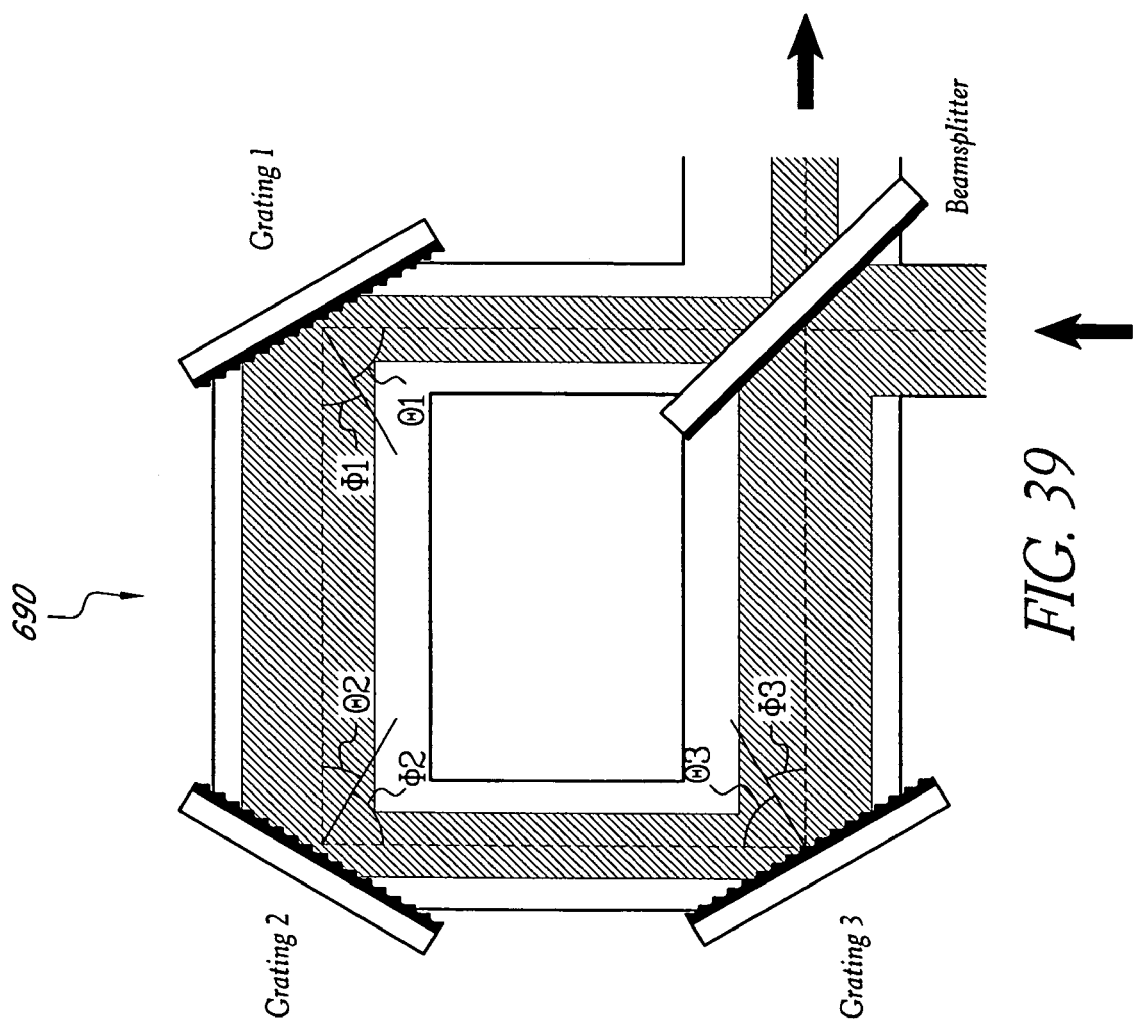
FIG. 39 schematically illustrates an example embodiment of a Sagnac interferometer where the widths of the transmitted and reflected beams are mismatched.

FIG. 39 shows one embodiment of a Sagnac interferometer 690 having a non-symmetric design. As such, the sizes of the transmitted beam (depicted as broad beam) and the reflected beam (depicted as narrow beam) can be different. Such difference in beam sizes can lead to inefficient use of the detector array, as well as a possible intensity mismatch between the beams.

Figure 40:
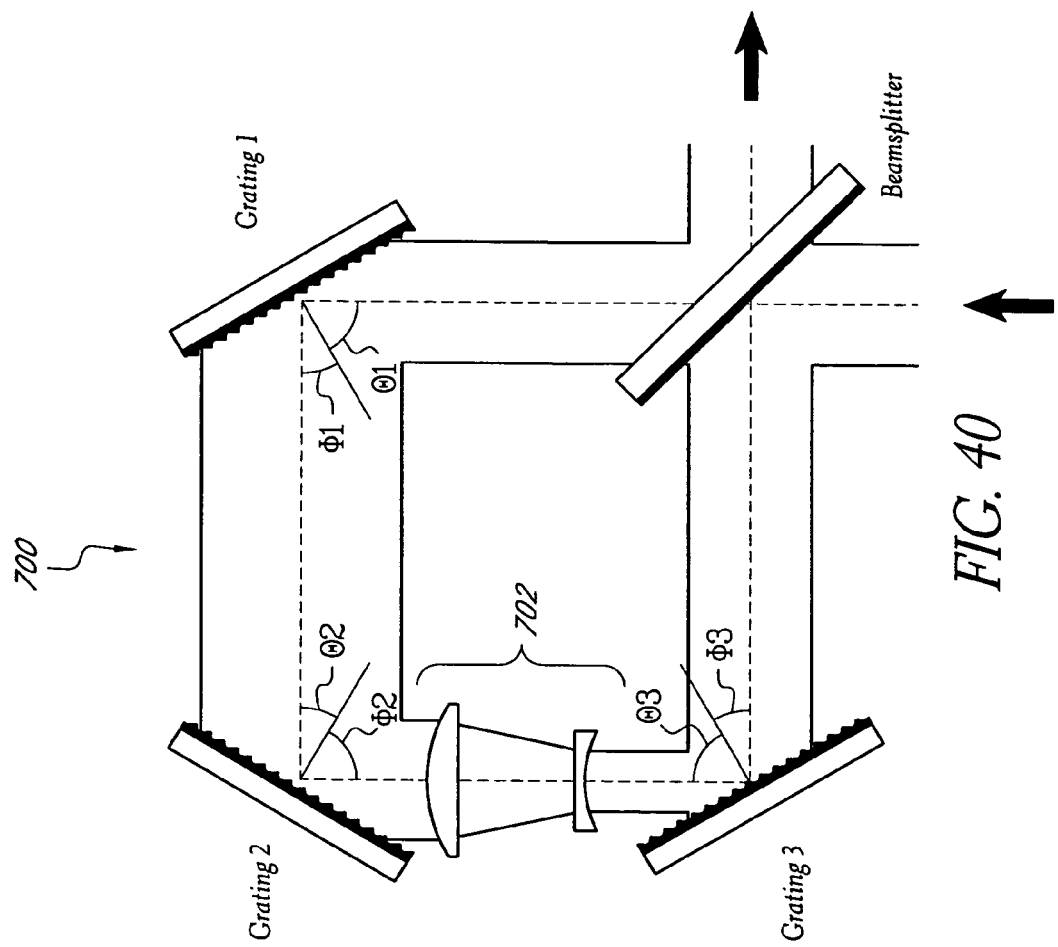
FIG. 40 schematically illustrates one embodiment of a Sagnac interferometer having an expanding telescope positioned between two gratings, so as to provide a substantially matched transmitted and reflected beams.

FIG. 40 shows one embodiment of a Sagnac interferometer 700, where the beam mismatch (of the example interferometer 690 of FIG. 39) is corrected by a beam expanding telescope 702 positioned between two gratings. The telescope 702 is shown to expand the reflected beam to a larger size, and reduce the transmitted beam to a smaller size. In some embodiments, the expansion factor of the telescope can be determined by $\Pi(\cos \phi_i/\cos \theta_i)$. Thus for the example interferometer 700, the expansion factor can be determined as $\cos \phi_i \cos \phi_2 \cos \phi_3/\cos \theta_1 \cos \theta_2 \cos \theta_3$.

For interferometers having symmetric designs, $\Pi(\cos \phi_i/\cos \phi_i)=1$. Thus, expanding telescopes are not needed for symmetric-grating interferometers.

Figure 41:
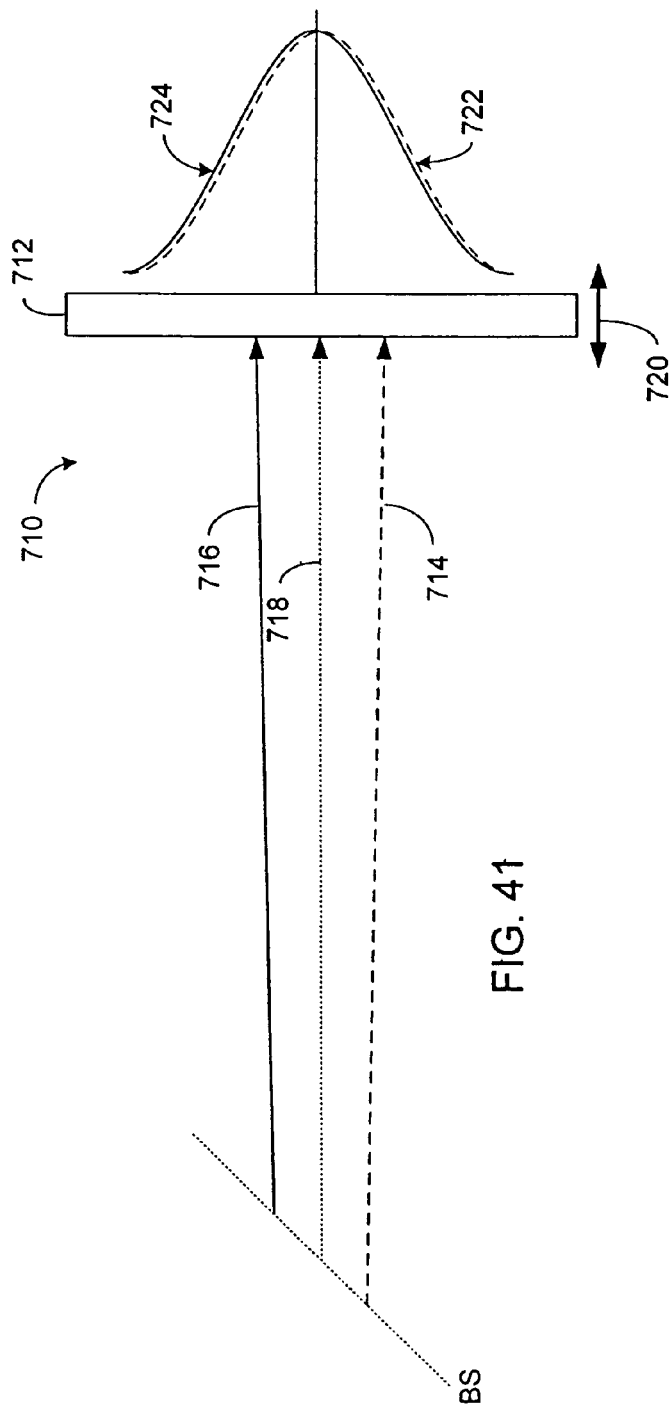
FIG. 41 schematically illustrates one embodiment of a detector positioned to receive transmitted and reflected beams.

FIG. 41 show one embodiment of a detector configuration 710, where a detector 712 is positioned to substantially capture transmitted and reflected beams (714, 716) emerging from a grating assembly (not shown) via, for example, a beamsplitter. In one embodiment, intensity of the transmitted and reflected beams can be represented by some distribution (such as a Gaussian). Thus, distributions 722 and 724 can represent the intensity of the transmitted and reflected beams at the detector 712.

Figure 42:
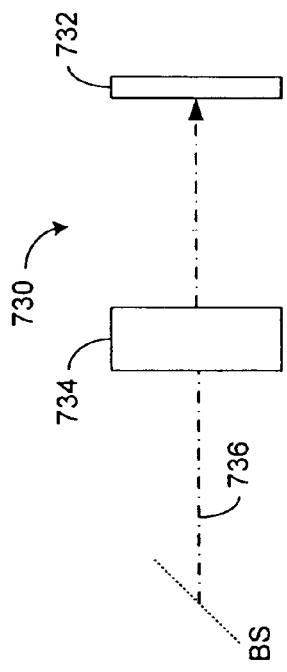
FIG. 42 shows that in one embodiment, one or more optical elements may be positioned between a beamsplitter and a detector so as to condition transmitted and reflected beams received by the detector.

FIG. 42 shows one embodiment of a detector configuration 730, where one or more optical elements (depicted as a block 734) may be positioned between a beamsplitter and a detector 732. The one or more optical elements 734 can receive the transmitted and reflected beams (collectively depicted as 736) emerging from the beamsplitter, so that when received by the detector 732 the beams 736 can be conditioned in some desirable manner. In certain embodiments, for example, the one or more optical elements may comprise a lens or optical system having and the detector 732 may be disposed at the Fourier transform plane of the lens or optical system to obtain optical Fourier transform of the interference pattern produced by the counter-propagating transmitted and reflected. In various embodiments, for example, the detector 732 is disposed at the focal plane of the lens or optical system.

Various embodiments described herein advantageously provide increase resolvability of spectral components ($\lambda_1$ and $\lambda_2$), for example, in a spectral distribution input into the spectrometer. Similarly, the spectometers can be extremely sensitive to changes in the wavelength of the beam over time.

Although the above-disclosed embodiments have shown, described, and pointed out the fundamental novel features of the invention as applied to the above-disclosed embodiments, it should be understood that various omissions, substitutions, and changes in the form of the detail of the devices, systems, and/or methods shown may be made by those skilled in the art without departing from the scope of the invention. Consequently, the scope of the invention should not be limited to the foregoing description, but should be defined by the appended claims.

What is claimed is:

1. A Sagnac interferometer, comprising:
a beamsplitter arranged to receive an input beam of light having different wavelengths $\lambda_1$ and $\lambda_2$, and split said input beam into first and second beams that travel along first and second paths, respectively, said first and second beams recombining along an output beam path;
a first grating arranged so as to diffract the first beam, said first grating oriented to provide a first incident angle and a first diffraction angle for the wavelength, $\lambda_1$, and to provide a first incident angle and a first diffraction angle for the wavelength, $\lambda_2$, in said first beam, the first diffraction angle for both of said wavelengths, $\lambda_1$ and $\lambda_2$, depending on the respective first incident angles and the respective wavelengths, the first incident angle and the first diffraction angle for both of said wavelengths, $\lambda_1$ and $\lambda_2$, being displaced to the same side of a line normal to the first grating; and
a second grating arranged so as to diffract the first beam after being diffracted by the first grating, said second diffraction grating oriented to provide a second incident angle and a second diffraction angle for said wavelength, $\lambda_1$, and to provide a second incident angle and a second diffraction angle for said wavelength, $\lambda_2$, such that said second incident angle for both of said wavelengths, $\lambda_1$ and $\lambda_2$, depends on the respective first diffraction angles, and the second diffraction angle for both of said wavelengths, $\lambda_1$ and $\lambda_2$, depends on the respective second incident angles and the respective wavelengths,
wherein said first and second gratings are oriented so that the second diffraction angle for the wavelength, $\lambda_1$, is different from the second diffraction angle for the wavelength, $\lambda_2$, the difference including (i) a first contribution caused by the difference in the respective wavelengths on the diffraction of the first beam by the second grating and (ii) a second contribution caused by a difference in the respective second incident angles resulting from the difference in the respective first diffraction angles, said first contribution reinforcing the second contribution.

2. The interferometer of claim 1, wherein the first and second gratings comprise reflective gratings.

3. The interferometer of claim 2, wherein the first and second gratings are symmetric about an axis of symmetry.

4. The interferometer of claim 1, wherein the first and second gratings comprise transmissive gratings.

5. The interferometer of claim 1, wherein the first incident angle and the second diffraction angle are greater than the first diffraction angle and the second incident angle, respectively, or, the first incident angle and the second diffraction angle are less than the first diffraction angle and the second incident angle, respectively.

6. A Sagnac interferometer, comprising
a beamsplitter arranged to receive an input beam of light having different wavelengths $\lambda_1$ and $\lambda_2$, and split said input beam into first and second beams that travel along first and second paths, respectively, said first and second beams recombining along an output beam path;
a first grating arranged so as to diffract the first beam, said first grating oriented to provide a first incident angle and a first diffraction angle for the wavelength, $\lambda_1$, and to provide a first incident angle and a first diffraction angle for the wavelength, $\lambda_2$, in said first beam, the first diffraction angle for both of said wavelengths, $\lambda_1$ and $\lambda_2$, depending on the respective first incident angles and the respective wavelengths;

a second grating arranged so as to diffract the first beam after being diffracted by the first grating, said second diffraction grating oriented to provide a second incident angle and a second diffraction angle for said wavelength, $\lambda_1$, and to provide a second incident angle and a second diffraction angle for said wavelength, $\lambda_2$, such that said second incident angle for both of said wavelengths, $\lambda_1$ and $\lambda_2$, depends on the respective first diffraction angles, and the second diffraction angle for both of said wavelengths, $\lambda_1$ and $\lambda_2$, depends on the respective second incident angles and the respective wavelengths, an odd number of mirrors between the first and second gratings; and wherein said first and second gratings are oriented so that the second diffraction angle for the wavelength, $\lambda_1$, is different from the second diffraction angle for the wavelength, $\lambda_2$, the difference including (i) a first contribution caused by the difference in the respective wavelengths on the diffraction of the first beam by the second grating and (ii) a second contribution caused by a difference in the respective second incident angles resulting from the difference in the respective first diffraction angles, said first contribution reinforcing the second contribution.

7. The interferometer of claim 6, wherein said odd number of mirrors comprises a single mirror arranged between the first and second gratings.

8. The interferometer of claim 1, further comprising an even number of mirrors between the first and second gratings.

9. The interferometer of claim 1, wherein said second grating is arranged so as to diffract the second beam, said second grating being oriented to provide a first incident angle and a first diffraction angle for the wavelength $\lambda_1$, and to provide a first incident angle and a first diffraction angle for the wavelength, $\lambda_2$, in the second beam, the first diffraction angle for both of said wavelengths, $\lambda_1$ and $\lambda_2$, of the second beam depending on the respective first incident angles and the respective wavelengths of the second beam, the first incident angle and the first diffraction angle for both of said wavelengths, $\lambda_1$ and $\lambda_2$, being displaced to the same side of a line normal to the second grating, wherein said first grating is arranged so as to diffract the second beam after being diffracted by the second grating, said first diffraction grating oriented to provide a second incident angle and a second diffraction angle for said wavelength, $\lambda_1$, in the second beam, and to provide a second incident angle and a second diffraction angle for said wavelength, $\lambda_2$, in the second beam, such that said second incident angle for both of said wavelengths, $\lambda_1$ and $\lambda_2$, depends on the respective first diffraction angles of the second beam, and the second diffraction angle for both of said wavelengths, $\lambda_1$ and $\lambda_2$, of the second beam depends on the respective second incident angles and the respective wavelengths, and wherein said first and second gratings are oriented so that the second diffraction angle for the wavelength, $\lambda_1$, in the second beam is different from the second diffraction angle for the wavelength, $\lambda_2$, in the second beam, the difference including (i) a first contribution caused by the difference in the respective wavelengths on the diffraction of the second beam by the first grating and (ii) a second contribution caused by the difference in the respective second incident angles of the second beam resulting from the difference in the respective first diffraction angles of the second beam, said first contribution to the difference between the second diffraction angle for the wavelength, $\lambda_1$, in the second beam and the second diffraction angle for the wavelength, $\lambda_2$, in the second beam reinforcing the second contribution to the difference between the second diffraction angle for the wavelength, $\lambda_1$, in the second beam and the second diffraction angle for the wavelength, $\lambda_2$, in the second beam.

10. The interferometer of claim 9, wherein the first beam is deviated towards a first side of the output beam path, and the second beam is deviated towards a second opposite side of the output beam path.

11. The interferometer of claim 10, further comprising an odd number of mirrors arranged in the first optical path between the second grating and the beamsplitter to cause the first and second beams to be deviated toward opposite sides of the output beam path.

12. The interferometer of claim 11, wherein said odd number of mirrors comprises a single mirror arranged in the first optical path between the second grating and the beamsplitter to cause the first and second beams to be deviated toward opposite sides of the output beam path.

13. The interferometer of claim 10, further comprising an even number of mirrors arranged in the first optical path between the second grating and the beamsplitter.

14. The interferometer of claim 1, further comprising at least one more grating disposed in said first and second optical paths to diffract said first optical beam after being diffracted by said first and second gratings.

15. The interferometer of claim 14, wherein said at least one more grating is arranged to provide a third incident angle and a third diffraction angle for the wavelength, $\lambda_1$, and to provide a third incident angle and a third diffraction angle for the wavelength, $\lambda_2$, such that said respective third incident angles depend on the respective second diffraction angles, the respective third diffraction angles depending on the respective third incident angles and the respective wavelengths, and wherein said at least one more grating is configured so that the third diffraction angle that is third diffraction angle for the wavelength, $\lambda_2$, is different from the third diffraction angle for the wavelength, $\lambda_1$, the difference including (i) a first contribution caused by the difference in the respective wavelengths on the diffraction of the first optical beam by the at least one more grating, and (ii) a second contribution caused by a difference in the respective third incident angles resulting from the difference in the respective second diffraction angles, said first contribution to the difference between the third diffraction angle for the wavelength, $\lambda_2$, and the third diffraction angle for the wavelength, $\lambda_1$, reinforcing the second contribution to the difference between the third diffraction angle for the wavelength, $\lambda_2$, and the third diffraction angle for the wavelength, $\lambda_1$.

16. The interferometer of claim 1, further comprising at least one actuator configured to rotate both said first and second gratings to provide adjustability in configuration of said first and second gratings to thereby accommodate different distributions of wavelengths.

17. A Sagnac interferometer, comprising:

a beamsplitter arranged to receive an input beam of light having a wavelength and split said input beam into first and second beams that travel along first and second paths, respectively, said first and second beams recombining along an output beam path;

a first grating disposed in said first optical path such that said first beam is incident upon said first grating at a first incident angle, said first grating diffracting said first beam by a first diffraction angle, the first incident angle and the first diffraction angle being displaced to the same side of a line normal to the first grating; and a second grating disposed in said first optical path to diffract said first beam by a second diffraction angle after being diffracted by the first grating, wherein said first and second gratings are configured such that first and second optical beams in said output beam path have an angular separation that is larger than either a first amount of angular separation caused by the first grating, or a second amount of angular separation caused by the second grating.

18. The interferometer of claim 17, further comprising at least one more grating.

19. The interferometer of claim 18, wherein said first and second gratings and said at least one more grating total at least 4 gratings.

20. The interferometer of claim 19, wherein said first and second gratings and said at least one more grating total at least 6 gratings.

21. The interferometer of claim 20, wherein said first and second gratings and said at least one more grating total at least 16 gratings.

22. The interferometer of claim 18, wherein at least two of said first and second gratings and said at least one more grating are rotatable as a pair.

23. The interferometer of claim 17, further comprising a beam expanding telescope disposed between said first and second gratings so as to provide substantially matched first and second beams between said first and second gratings.

24. A Sagnac interferometer, comprising:
a beamsplitter arranged to receive an input beam of light having a wavelength and split said input beam into first and second beams that travel along first and second paths, respectively, said first and second beams recombining along an output beam path;
a first grating disposed in said first optical path to diffract said first beam by a first angle;
a second grating disposed in said first optical path to diffract said first beam by a second angle after being diffracted by the first grating; and
at least one mirror disposed in said first and second optical paths between the first and second gratings,
wherein said first and second gratings are configured such that first and second optical beams in said output beam path have an angular separation that is larger than either a first amount of angular separation caused by the first grating, or a second amount of angular separation caused by the second grating.

25. A Sagnac interferometer, comprising:
a beamsplitter arranged to receive an input beam of light having at least one wavelength and split said input beam into first and second beams that travel along first and second paths, respectively, said first and second beams recombining along an output beam path;
a first grating disposed in said first optical path so as to diffract the first beam; and
a second grating disposed in said first optical path to diffract the first beam after being diffracted by the first grating, said first and second gratings further disposed in said second optical path to diffract said second optical beam,
wherein said first and second gratings are oriented so as to satisfy the principle of reinforcement, and wherein the first and second paths comprise at least one diffractive order of said first and second gratings that is greater than the ±1 diffractive order.

26. The interferometer of claim 25, further comprising at least one mirror disposed in said first and second optical paths between the first and second gratings.

27. The interferometer of claim 25, wherein said first and second gratings are arranged to satisfy the principle of crossing.

28. The interferometer of claim 25, further comprising at least one mirror disposed in said first and second optical paths between said first and second gratings and said beamsplitter.

29. The interferometer of claim 25, further comprising a beam expanding telescope disposed between said first and second gratings so as to provide substantially matched first and second beams between said first and second gratings.

30. A Sagnac interferometer, comprising:
means for splitting an input beam of light having at least one wavelength into first and second beams that travel along first and second paths, respectively, said first and second beams recombining along an output beam path;
first means for diffracting said first beam at a diffraction angle that is displaced to the same side of a line normal to a surface of said first means where said first beam is incident upon said first means; and
second means for diffracting said first beam after being diffracted by the first diffracting means,
wherein said first and second diffracting means satisfy the principle of reinforcement.

31. The interferometer of claim 30, wherein said beamsplitting means comprises a beamsplitter and said first and second diffracting means comprises first and second gratings.

32. The interferometer of claim 30, wherein said first and second diffracting means satisfy the principle of crossing.

33. A Sagnac interferometer, comprising:
a beamsplitter arranged to receive an input beam of light having a wavelength and split said input beam into first and second beams that travel along first and second paths, respectively, said first and second beams recombining along an output beam path;
a plurality of gratings disposed in said first path so as to diffract said first optical beam by a first angle, said plurality of gratings further disposed in said second optical path so as to diffract said second optical beam by a second angle,
wherein said plurality of gratings is arranged such that said first and second beams are combined parallel to one another in a reference direction if their wavelength is equal to a reference wavelength,
wherein, if the wavelength of the first and second beams is not equal to the reference wavelength, said first beam is outputted in a first direction and said second beam is outputted in a second direction, said plurality of gratings being arranged such that when said first and second optical beams are combined, the angular separation between said first and second optical beams is larger than the absolute value of the angle between the first direction and the reference direction, and larger than the absolute value of the angle between the second direction and the reference direction, and
wherein the first and second paths comprise at least one diffractive order of said plurality of gratings that is greater than the ±1 diffractive order.

34. The interferometer of claim 33, further comprising one or more mirrors disposed in said first and second optical paths between said plurality of gratings and said beamsplitter.

35. The interferometer of claim 33, wherein said plurality of gratings are configured such that angular dispersion introduced by said plurality of gratings together is larger than the angular dispersion introduced by the gratings individually.

36. A Sagnac interferometer, comprising:
a beamsplitter arranged to receive an input beam of light having a wavelength and split said input beam into first and second beams that travel along first and second paths, respectively, said first and second beams recombining along an output beam path;
a plurality of gratings disposed in said first path so as to diffract said first optical beam a first angle, said plurality of gratings further disposed in said second optical path so as to diffract said second optical beam at a second angle; and
one or more mirrors disposed in said first and second paths between any two of said plurality of gratings,
wherein said plurality of gratings satisfy the principle of crossing.

37. The interferometer of claim 36, further comprising one or more mirrors disposed in said first and second optical paths between said plurality of gratings and said beamsplitter.

38. A Sagnac interferometer, comprising:
means for splitting an input beam of light into first and second beams that travel along first and second paths, respectively, said first and second beams recombining along an output beam path;
means for diffracting said first optical beam and said second optical beam, said means for diffracting comprising more than two diffractive surfaces,
wherein said diffracting means are arranged such that said first and second optical beams are combined parallel to one another in a reference direction if their wavelength is equal to a reference wavelength, and
wherein, if the wavelength of the first and second optical beams is not equal to the reference wavelength, said first optical beam is outputted in a first direction and said second optical beam is outputted in a second direction, said diffracting means being arranged such that when said first and second optical beams are combined, the angular separation between said first and second optical beams is larger than the absolute value of the angle between the first direction and the reference direction, and larger than the absolute value of the angle between the second direction and the reference direction.

39. The interferometer of claim 38, wherein said beamsplitting means comprises a beamsplitter and said diffracting means comprises first and second diffraction gratings.

40. A laser system, comprising:
a laser outputting a laser beam having a wavelength spectrum;
a beamsplitter disposed to receive said laser beam and divert a portion of said laser beam; and
a Sagnac interferometer disposed with respect to said beamsplitter to receive said diverted portion of said laser beam to measure the wavelength spectrum thereof.

41. The laser system of claim 40, further comprising a feedback loop from said Sagnac interferometer to said laser to adjust said laser based on said measured wavelength spectrum.

42. A laser system, comprising:
a laser outputting a laser beam having a wavelength;
a beamsplitter disposed to receive said laser beam and divert a portion of said laser beam; and
a Sagnac interferometer disposed with respect to said beamsplitter to receive said diverted portion of said laser beam to measure the wavelength thereof, wherein said Sagnac interferometer comprises a plurality of gratings.

43. The laser system of claim 42, further comprising a feedback loop from said Sagnac interferometer to said laser to adjust said laser based on said measured wavelength.

44. The laser system of claim 43, wherein said plurality of gratings are arranged to satisfy the principle of reinforcement.

45. The laser system of claim 43, wherein said plurality of gratings are arranged to satisfy the principle of crossing.

46. The laser system of claim 43, further comprising at least one actuator configured to rotate said plurality of gratings to measure different wavelengths.

47. A Sagnac interferometer, comprising:
a beamsplitter arranged to receive an input beam of light having a wavelength and split said input beam into first and second beams that travel along first and second paths, respectively, said first and second beams recombining along an output beam path;
a first grating arranged so as to diffract the first beam, said first grating oriented to provide a first incident angle and a first diffraction angle, the first diffraction angle depending on the first incident angle and the wavelength, the first incident angle and the first diffraction angle being displaced to the same side of a line normal to the first grating; and
a second grating arranged so as to diffract the first beam after being diffracted by the first grating, said second diffraction grating oriented to provide a second incident angle and a second diffraction angle such that said second incident angle depends on the first diffraction angle, the second diffraction angle depending on the second incident angle and the wavelength, the second incident angle and the second diffraction angle being displaced to the same side of a line normal to the second grating,
wherein said first and second gratings are oriented so that a change in wavelength in the first optical beam changes the second diffraction angle, said change in said second diffraction angle including (i) a first contribution caused by the change in wavelength on the diffraction of the first beam by the second grating and (ii) a second contribution caused by a change in the second incident angle resulting from the change in the first diffraction angle, said first contribution reinforcing the second contribution.

48. The interferometer of claim 47,
wherein said second grating is arranged so as to diffract the second beam, said second grating being oriented to provide a first incident angle and a first diffraction angle for the second beam, the first diffraction angle of the second beam depending on the first incident angle and the wavelength of the second beam, the first incident angle and the first diffraction angle of the second beam being displaced to the same side of the line normal to the second grating,
wherein said first grating is arranged so as to diffract the second beam after being diffracted by the second grating, said first diffraction grating oriented to provide a second incident angle and a second diffraction angle for the second beam such that said second incident angle depends on the first diffraction angle of the second beam, the second diffraction angle of the second beam depending on the second incident angle and the wavelength of the second beam, the second incident angle and the second diffraction angle of the second beam being displaced to the same side of the line normal to the first grating, and wherein said first and second gratings are oriented so that a change in wavelength in the second optical beam identical to the change in wavelength of the first beam changes the second diffraction angle of the second beam, said change in said second diffraction angle of the second beam including (i) a first contribution caused the change in wavelength of the second beam on the diffraction of the second beam by the first grating and (ii) a second contribution caused by a change in the second incident angle of the second beam resulting from the change in the first diffraction angle of the second beam, said first contribution to said change in said second diffraction angle of the second beam reinforcing the second contribution to said change in said second diffraction angle of the second beam.

49. The interferometer of claim 47, further comprising at least one more grating,
wherein said at least one more grating is arranged to provide a third incident angle and a third diffraction angle such that said third incident angle depends on the second diffraction angle, the third diffraction angle depending on the third incident angle and the wavelength, the third incident angle and the third diffraction angle being displaced to the same side of a line normal to the at least one more grating, and
wherein said at least one more grating is configured so that a change in wavelength changes the third diffraction angle, said change in said third diffraction angle including (i) a first contribution caused by the change in wavelength on the diffraction of the first optical beam by the at least one more grating, and (ii) a second contribution caused by a change in the third incident angle resulting from the change in the second diffraction angle, said first contribution to said change in said third diffraction angle reinforcing the second contribution to said change in said third diffraction angle.

50. The interferometer of claim 47, wherein the first beam is deviated towards a first side of the output beam path, and the second beam is deviated towards a second opposite side of the output beam path.

51. A Sagnac interferometer, comprising:
a beamsplitter arranged to receive an input beam of light having a wavelength and to split said input beam into first and second beams that travel along first and second paths, respectively, said first and second beams recombining along an output beam path;
an odd number of at least three gratings disposed along said first and second paths such that each of said odd number of at least three gratings imparts an amount of angular separation between said first and second beams; and
a beam expander disposed along said first and second paths to match said first and second beams,
wherein said odd number of at least three gratings are disposed such that said first and second optical beams in said output beam path have a total amount of angular separation that is larger than the angular separation imparted by any one of the odd number of at least three gratings.

52. The Sagnac interferometer of claim 51, wherein said first and second paths cross one another in between any two of the odd number of at least three gratings.

53. The Sagnac interferometer of claim 51, wherein said first and second optical beams in said output beam path have a total amount of angular separation that is larger than the sum of the amounts of angular separation imparted by any subset of the odd number of at least three gratings.

54. A Sagnac interferometer, comprising:
a beamsplitter arranged to receive an input beam of light having a wavelength and to split said input beam into first and second beams that travel along first and second paths, respectively, said first and second beams recombining along an output beam path; and
an even number of at least four gratings disposed along said first and second paths such that each of said even number of at least four gratings imparts an amount of angular separation between said first and second beams;
wherein said even number of at least four gratings are disposed such that said first and second optical beams in said output beam path have a total amount of angular separation that is larger than the angular separation imparted by any one of the even number of at least four gratings.

55. The Sagnac interferometer of claim 54, wherein said first and second paths cross one another in between any two of the even number of at least four gratings.

56. The Sagnac interferometer of claim 54, wherein said first and second optical beams in said output beam path have a total amount of angular separation that is larger than the sum of the amounts of angular separation imparted by any subset of the even number of at least four gratings.

57. The Sagnac interferometer of claim 54, wherein the first and second beams are incident upon, and diffracted from, each of the even number of at least four gratings at angles that are displaced to the same side of a line normal to each respective grating.

58. The Sagnac interferometer of claim 54, wherein the even number of at least four gratings comprises exactly four gratings, and further comprising a mirror disposed along the first optical path between the beam splitter and the first of the four gratings along the first path.

59. The Sagnac interferometer of claim 54, wherein said even number of at least four gratings are located and oriented symmetrically about an axis of symmetry.

60. The Sagnac interferometer of claim 54, further comprising:
a detector disposed along the output beam path to detect an interference fringe pattern resulting from the total amount of angular separation between the first and second beams; and
a processor communicatively coupled with the detector to analyze the interference fringe pattern and to determine the wavelength of the input beam of light based on the number of fringes in the interference fringe pattern.

* * * * *